(12) United States Patent
Narine et al.

(10) Patent No.: US 10,738,251 B2
(45) Date of Patent: Aug. 11, 2020

(54) BIODIESEL COMPOSITIONS CONTAINING POUR POINT DEPRESSANTS AND CRYSTALLIZATION MODIFIERS

(71) Applicant: TRENT UNIVERSITY, Peterborough (CA)

(72) Inventors: Suresh Narine, Peterborough (CA); Laziz Bouzidi, Peterborough (CA); Athira Mohanan, Peterborough (CA)

(73) Assignee: Trent University, Peterborough, Ontario (CA)

( * ) Notice: Subject to any disclaimer, the term of this patent is extended or adjusted under 35 U.S.C. 154(b) by 0 days.

(21) Appl. No.: 15/343,831

(22) Filed: Nov. 4, 2016

(65) Prior Publication Data

US 2017/0121617 A1    May 4, 2017

Related U.S. Application Data

(60) Provisional application No. 62/250,577, filed on Nov. 4, 2015.

(51) Int. Cl.
| | |
|---|---|
| *C10L 10/14* | (2006.01) |
| *C10L 10/16* | (2006.01) |
| *C10L 1/02* | (2006.01) |
| *C10L 1/14* | (2006.01) |
| *C10L 1/19* | (2006.01) |
| *C10L 1/196* | (2006.01) |

(52) U.S. Cl.
CPC ............... *C10L 1/026* (2013.01); *C10L 1/143* (2013.01); *C10L 10/14* (2013.01); *C10L 10/16* (2013.01); *C10L 1/191* (2013.01); *C10L 1/1963* (2013.01); *C10L 2200/0476* (2013.01); *C10L 2270/026* (2013.01); *Y02E 50/13* (2013.01)

(58) Field of Classification Search
CPC ..... C10L 10/14; C10L 10/16; C10L 2200/0476
See application file for complete search history.

(56) References Cited

U.S. PATENT DOCUMENTS

| | | | |
|---|---|---|---|
| 6,203,585 B1 * | 3/2001 | Majerczak | C10L 1/143 44/388 |
| 2006/0288637 A1 * | 12/2006 | Choo | C10L 1/026 44/385 |
| 2011/0113679 A1 * | 5/2011 | Cohen | C10G 45/00 44/388 |
| 2013/0269241 A1 * | 10/2013 | Narine | C10L 1/19 44/308 |

FOREIGN PATENT DOCUMENTS

WO    WO-2013192384 A1 *  12/2013  ............... C11C 3/00

OTHER PUBLICATIONS

Suganthi L, Samuel AA. Energy models for demand forecasting—A review. Renew Sust Energ Rev. 2012;16 (2):1223-40.

(Continued)

*Primary Examiner* — Ellen M Mcavoy
*Assistant Examiner* — Ming Cheung Po
(74) *Attorney, Agent, or Firm* — Bereskin & Parr LLP/S.E.N.C.R.L.; Michael Fenwick

(57) ABSTRACT

This present disclosure relates to biodiesel compositions comprising polymeric pour point depressants, and crystallization modifiers, to improve cold flow properties for biodiesel fuels.

4 Claims, 20 Drawing Sheets

(56) References Cited

OTHER PUBLICATIONS

McGlade C, Ekins P. The geographical distribution of fossil fuels unused when limiting global warming to 2 [deg]C. Nature. 2015;517(7533):187-190.

Nejat P, Jomehzadeh F, Taheri MM, Gohari M, Abd. Majid MZ. A global review of energy consumption, CO2 emissions and policy in the residential sector (with an overview of the top ten CO2 emitting countries). Renew Sust Energ Rev. 2015; 43, 843-862.

Graboski MS, McCormick RL. Combustion of fat and vegetable oil derived fuels in diesel engines. Prog Energ Combust. 1998; 24(2), 125-64.

Knothe G. Improving biodiesel fuel properties by modifying fatty ester composition. Energy & Environmental Science. 2009; 2(7), 759-766.

Chiu C-W, Schumacher LG, Suppes GJ. Impact of cold flow improvers on soybean biodiesel blend. Biomass and Bioenergy. 2004; 27(5), 485-491.

Pérez Á, Casas A, Fernández CM, Ramos MJ, Rodriguez L. Winterization of peanut biodiesel to improve the cold flow properties. Bioresource technology. 2010; 101(19), 7375-7381.

Xue Y, Zhao W, Ma P, Zhao Z, Xu G, Yang C, et al. Ternary blends of biodiesel with petro-diesel and diesel from direct coal liquefaction for improving the cold flow properties of waste cooking oil biodiesel. Fuel. 2016; 177, 46-52.

Silva PH, Gonçalves VL, Mota CJ. Glycerol acetals as anti-freezing additives for biodiesel. Bioresour Technol. 2010; 101(15), 6225-6229.

Baker M, Bouzidi L, Narine SS. Mitigating crystallization of saturated FAMEs (fatty acid methyl esters) in biodiesel: 2. The phase behavior of 2-stearoyl diolein-methyl stearate binary system. Energy. 2015;83:647-57.

Hamada H, Kato H, Ito N, Takase Y, Nanbu H, Mishima S, et al. Effects of polyglycerol esters of fatty acids and ethylene-vinyl acetate co-polymer on crystallization behavior of biodiesel. Eur J Lipid Sci Technol. 2010;112 (12):1323-30.

Mohanan A, Bouzidi L, Li S, Narine SS. Mitigating crystallization of saturated FAMES in biodiesel: 5. The unusual phase behavior of a structured triacylglycerol dimer and methyl palmitate binary system. Energy. 2015;93:1011-1021.

Mohanan A, Bouzidi L, Li S, Narine SS. Mitigating crystallization of saturated fames in biodiesel: 1. Lowering crystallization temperatures via addition of metathesized soybean oil. Energy. 2016;96:335-345.

Mohanan A, Bouzidi L, Narine SS. Mitigating crystallization of saturated FAMES (fatty acid methyl esters) in biodiesel: 4. The phase behavior of 1,3-dioleoyl-2-palmitoyl glycerol—Methyl stearate binary system. Energy. 2016;96:242-52.

Mohanan A, Bouzidi L, Narine SS. Mitigating Crystallization of Saturated FAMES in Biodiesel 6: The Binary Phase Behavior of 1,2-dioleoyl-3-stearoyl sn-glycerol—Methyl Stearate. Energy. 2016; 100, 273-284.

Ribeiro NM, Pinto AC, Quintella CM, da Rocha GO, Teixeira LS, Guarieiro LL, et al. The role of additives for diesel and diesel blended (ethanol or biodiesel) fuels: a review. Energy Fuels. 2007;21(4):2433-45.

Sem CH, May CY, Zakaria Z, Daik R, Foon CS. The effect of polymers and surfactants on the pour point of palm oil methyl esters. Eur J Lipid Sci Technol. 2007; 109(4), 440-444.

Wang J, Cao L, Han S. Effect of polymeric cold flow improvers on flow properties of biodiesel from waste cooking oil. Fuel. 2014; 117, Part A(0), 876-881.

Wu C, Zhang J-I, Li W, Wu N. Molecular dynamics simulation guiding the improvement of EVA-type pour point depressant. Fuel. 2005; 84(16), 2039-2047.

Zhang J, Wu C, Li W, Wang Y, Han Z. Study on performance mechanism of pour point depressants with differential scanning calorimeter and X-ray diffraction methods. Fuel. 2003; 82(11), 1419-1426.

Boshui C, Yuqiu S, Jianhua F, Jiu W, Jiang W. Effect of cold flow improvers on flow properties of soybean biodiesel. Biomass Bioenerg. 2010; 34(9), 1309-1313.

Soriano Jr NU, Migo VP, Matsumura M. Ozonized vegetable oil as pour point depressant for neat biodiesel. Fuel. 2006; 85(1), 25-31.

Soriano NU, Migo VP, Sato K, Matsumura M. Crystallization behavior of neat biodiesel and biodiesel treated with ozonized vegetable oil. Eur J Lipid Sci Technol. 2005; 107(9), 689-696.

Chastek TQ. Improving cold flow properties of canola-based biodiesel. Biomass & Bioenergy. 2011; 35(1), 600-607.

Chandran DV, Bhatnagar RK. A method for synthesis of a-monoricinolein. Journal of the American Oil Chemists Society. 1968;45(8):581-2.

Bentley PH, McCrae W. Efficient synthesis of symmetrical 1,3-diglycerides. J Org Chem. 1970;35(6):2082-3.

Pillai PKS, Li S, Bouzidi L, Narine SS. Metathesized palm oil & novel polyol derivatives: Structure, chemical composition and physical properties. Industrial Crops and Products. 2016; 84, 205-223.

Giraldo SY, Rios LA, Suárez N. Comparison of glycerol ketals, glycerol acetates and branched alcohol-derived fatty esters as cold-flow improvers for palm biodiesel. Fuel. 2013; 108, 709-714.

Joshi H, Moser BR, Toler J, Smith WF, Walker T. Ethyl levulinate: A potential bio-based diluent for biodiesel which improves cold flow properties. Biomass & Bioenergy. 2011; 35(7), 3262-3266.

Moser BR. Preparation and evaluation of multifunctional branched diesters as fuel property enhancers for biodiesel and petroleum diesel fuels. Energ Fuel. 2014; 28(5), 3262-3270.

Cao L, Wang J, Liu K, Han S. Ethyl acetoacetate: A potential bio-based diluent for improving the cold flow properties of biodiesel from waste cooking oil. Appl Energy. 2014; 114(0), 18-21.

Marangoni AG, Acevedo N, Maleky F, Peyronel F, Mazzanti G, Quinn B, et al. Structure and functionality of edible fats. Soft Matter. 2012; 8(5), 1275-1300.

Zhang J, Wu C, Li W, Wang Y, Cao H. DFT and MM calculation: the performance mechanism of pour point depressants study. Fuel. 2004; 83(3), 315-326.

Zhang H, Liu H, Wang S. A new alternating copolymerized derivative as a cold flow improver for diesel fuel. Pet Sci. 2009; 6(1), 82-85.

Athira Mohanan, Bruce Darling, Laziz Bouzidi, Suresh S. Narine. Mitigating crystallization of saturated FAMES (fatty acid methyl esters) in biodiesel. 3. The binary phase behavior of 1,3-dioleoyl-2-palmitoyl glycerol e Methyl palmitate e A multi-length scale structural elucidation of mechanism responsible for inhibiting FAME crystallization. Energy 2015; 86, 500-513.

\* cited by examiner

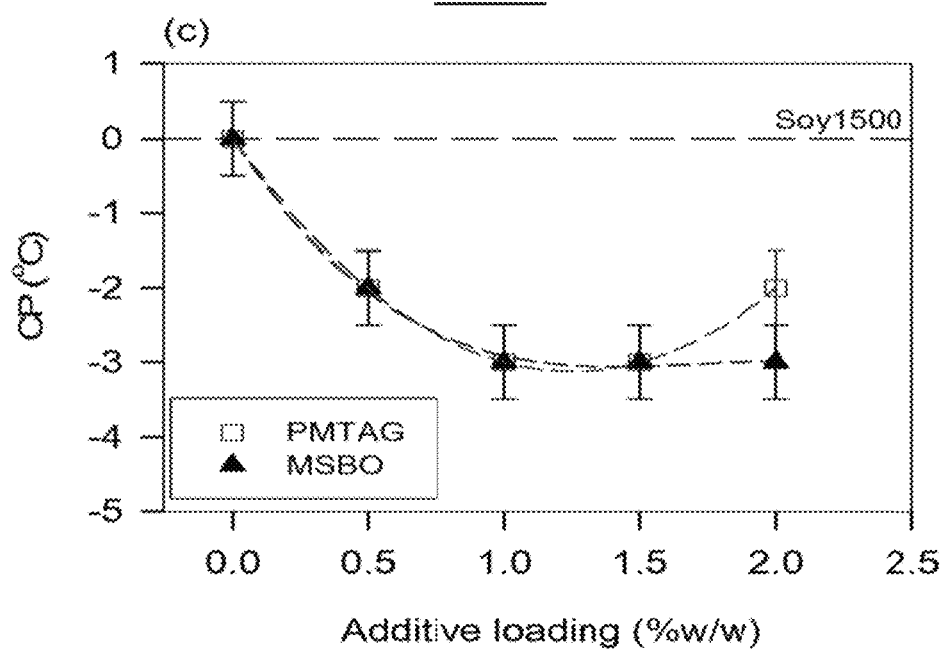

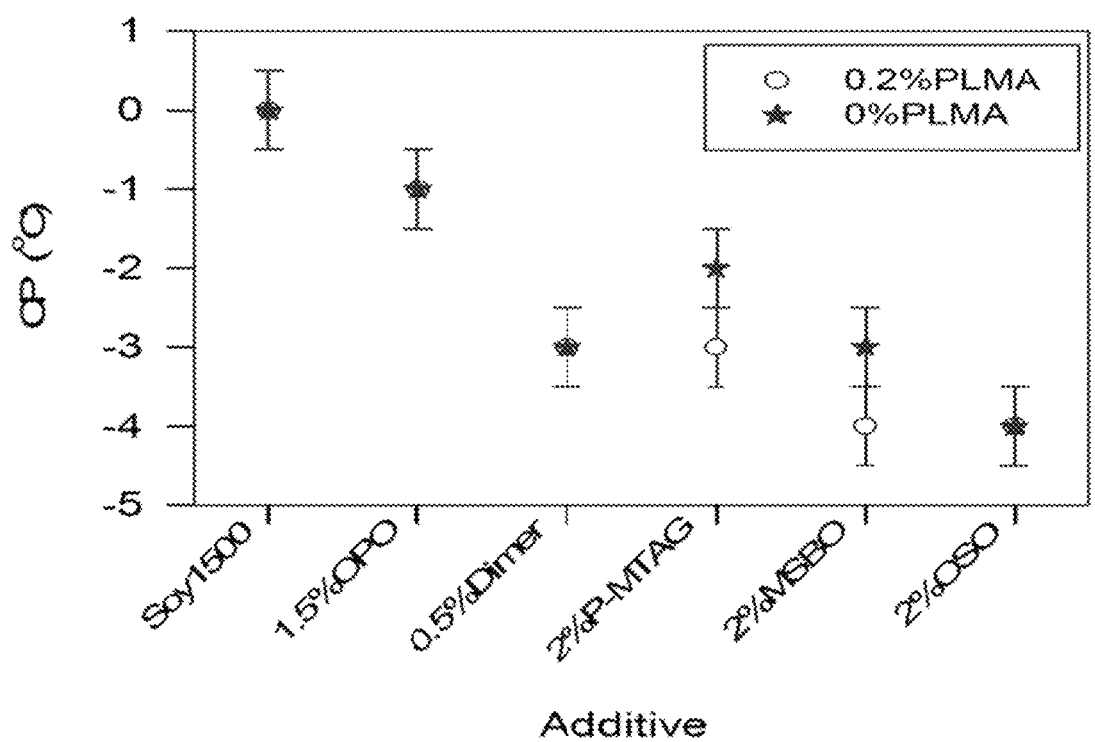

FIG. 9

| Soy1500 | 0.2% w/w PLMA | 0.5% w/w Dimer | 1.5% w/w OPO | |
|---|---|---|---|---|
| 1500 ±500 | 1500 ±500 | 125 ±25 | 15 ±5 | 250 ±50 | 25 ±5 | 1500 ±50 | 700 ±5 |

| | 2% w/w MSBO | 2% w/w OSO | 2% w/w PMTAG |
|---|---|---|---|
| | 120 ±20 | 20 ±10 | 150 ±50 | 70 ±5 | 30 ±10 | 10 ±5 |

|  | -6 °C | -10 °C | -15 °C | -20 °C | -50 °C |
|---|---|---|---|---|---|
| FIG. 11A | | | | | |
| FIG. 11B | | | | | |

|  | VOCM alone | | VOCM+0.2% w/w PLMA | |
|---|---|---|---|---|
| Soy1500 | | | | |
| Length/Breadth | 1500 ±500 | 1500 ±500 | 125 ±25 | 15 ±5 |
| 1.5% w/w OPO | | | | |
| Length/Breadth | 1500 ±50 | 700 ±5 | 500 ±20 | 200 ±5 |
| 0.5% w/w Dimer | | | | |
| Length/Breadth | 250 ±50 | 25 ±5 | 200 ±50 | 10 ±5 |
| 2% w/w MSBO | | | | |
| Length/Breadth | 120 ±20 | 20 ±10 | 80 ±20 | 15 ±10 |
| 2% w/w OSO | | | | |
| Length/Breadth | 150 ±50 | 70 ±5 | 100 ±20 | 20 ±10 |
| 2% w/w PMTAG | | | | |
| Length/Breadth | 30 ±10 | 10 ±5 | 30 ±10 | 10 ±5 |

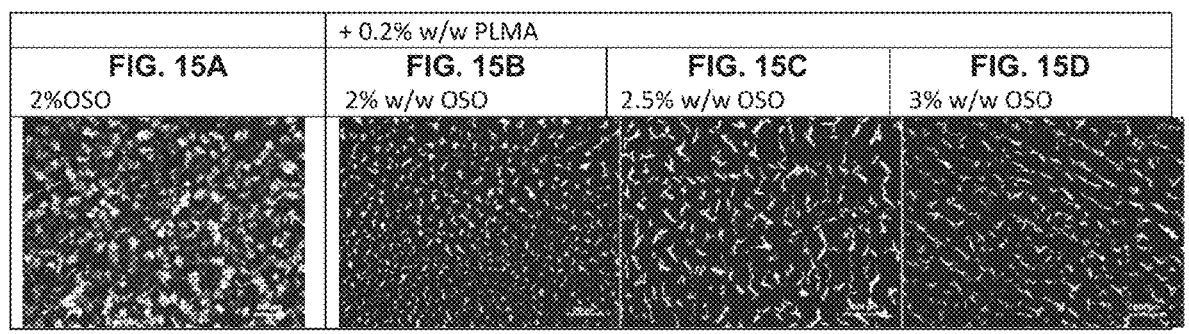

BIODIESEL COMPOSITIONS CONTAINING POUR POINT DEPRESSANTS AND CRYSTALLIZATION MODIFIERS

CROSS-REFERENCE TO RELATED APPLICATIONS

The present application claims the benefit of priority from U.S. provisional application No. 62/250,577 filed on Nov. 4, 2015, the contents of which are incorporated herein by reference in their entirety.

FIELD

This application relates to biodiesel compositions comprising polymeric pour point depressants and crystallization modifiers to improve cold flow properties of biodiesel fuels.

INTRODUCTION

Diesel fuels and/or biodiesel fuels typically contain wax, and when subjected to low temperatures, these fuels often undergo wax crystallization, gelling and/or viscosity increase. This reduces the ability of the fuel to flow and creates filter plugging which adversely affects the operability of vehicles using these fuels. Flow improvers have been used to modify the wax structure as it builds during cooling. These additives are typically used to keep the wax crystals small so that they can pass through fuel filters. Also, pour point dispersants are sometimes used in diesel fuel to ensure that it can be pumped at low temperatures.

Due to environmental concerns and the decline of known petroleum reserves with subsequent price increases of petroleum, biodiesel fuels are becoming a focus of intense research and development efforts. Biodiesel fuels typically comprise fatty acid esters, prepared for example by transesterifying triglycerides with lower alcohols, e.g. methanol or ethanol. A typical biodiesel fuel is the fatty acid ester of a natural oil (i.e. rapeseed oil or of soybean oil, as non-limiting examples), and can be used in a given jurisdiction if it meets specifications mandated by national or regional standards, such as ASTM D6751 in the United States or EN 14214 standards in Europe. One of the major problems associated with the use of biodiesel is its poor cold flow properties resulting from crystallization of saturated fatty compounds in cold conditions, as indicated by its relatively high cloud points (CP) and pour points (PP). For example, soybean oil and palm oil biodiesels present CPs of ~0° C. and 15° C., respectively, whereas, No. 1 diesel has a CP of about −40° C. Furthermore, biodiesel tends to have a narrow range of temperatures between CP and PP, adding to its cold flow problems. Heaters and insulators may be installed along the fuel line and storage facilities to allow its use at temperatures lower than the CP or PP, but this incurs additional costs. A 20° C. reduction in cold filter plugging point is necessary for some biodiesel fuels to find utility in colder climates such as those of North America and Europe in winter.

The cold flow characteristics of biodiesel are described by standardized measurements of temperatures related to field operability such as the cloud point (CP, ASTM D2500), the cold filter plugging point (CFPP, ASTM D6371) and the pour point (PP, ASTM D97). The CP, CFPP and PP are directly correlated to particular points in the crystallization process. CP is defined as the temperature at which fuel starts to appear cloudy, i.e., once the crystals become visible. CFPP is the lowest temperature at which the growing crystals can pass through a standard (45 μm) filter. The PP is reached when the fuel is prevented from flowing. This occurs when the fluid is viscous enough to be immobilized or when the crystals form a three dimensional solid network capable of trapping the liquid.

Several efforts to mitigate the low-temperature problems of biodiesel have been investigated over the past several years. Many popular approaches have included blending biodiesel with conventional diesel fuel, winterization, and use of synthetic additives. Also, studies have been performed to show the diversification in the feedstock and genetic modification of the feedstock, aimed to provide a reduction in the saturated content of the fatty acid methyl esters (FAME) in biodiesel as well as modification of FAME composition/profile of the fuels. While there have been efforts to create additives that may reduce the PP and cold filter plugging point (CFPP) of fuels, many are not cost effective. Also, increasing the unsaturated content of biodiesel may improve its cold flow properties, but also leads to the alteration of the oxidative stability of the fuel. The overall thermal behavior of biodiesel is affected by the relative concentration of its saturated and unsaturated FAME components. The cold flow issue is primarily a multifaceted problem of crystallization (of saturated FAMEs) in solution (unsaturated FAMEs) which can be approached from several angles.

Several approaches have been tried to improve the cold-weather performance of biodiesel. Some approaches are fundamentally targeted at modifying composition or/and structure, or at altering the crystallization behavior of the biodiesel by additives. The appropriate adjustment of the molecular composition of biodiesel is in principle a straightforward method that would beneficially impact the crystallization parameters. For example, although at the cost of a yield loss, CP and/or PP can be significantly reduced by simple processing methods, such as "winterization" which reduces the long chain FAMEs content, the main culprit for the early crystallization of biodiesel. Also, a biodiesel that is relatively rich in low melting temperature compounds can be produced by chemically reacting the lipid feedstock with an alcohol producing fatty acid esters other than methanol. These modification methods however are either generally not efficient or expensive, or both.

Several approaches have been utilized to lower the onset temperature of crystallization of biodiesel, targeting particularly the saturated FAMEs such as methyl palmitate (MeP) and methyl stearate (MeS), which influence most of its flow behavior at low temperature.

Application of cold flow improver (CFI) additives is the most popular approach used to treat biodiesel. CFI additives are designed to lower the temperature characteristics of biodiesel such as CP and PP by disrupting the crystallization process at as many length scales as possible from nucleation and crystalline growth to agglomeration. The existing CFI additives can be classified into two large categories: (i) crystallization modifiers which affect one or more phases of the crystallization process, and (ii) pour point depressants (PPDs) which function as crystal growth limiters. Unfortunately, no one single approach has yet been able to simultaneously address both PP and CP effectively. Additives that are capable of altering both nucleation and growth are preferred as they can delay crystallization and reduce the size of the crystals. Notice that most commercially available additives are designed specifically for petro-diesel and do not work as well for biodiesel because of this specificity requirement.

The cloud point depressants (CPD) work principally by disturbing the crystallization process at small length scales, principally at the nucleation and early stages of growth. The growth and aggregation of FAME crystals can follow quite rapidly, drastically limiting the effect of the additive on the PP. Previous reports have shown that at 5% vol. loading, a glycerol derivative, glycerol butanal acetal, depressed CP of animal fat biodiesel by ~5° C. but achieved a PP that was just 1° C. below the CP.

The pour point depressants (PPDs) are designed to aid pumpability, and as a result affect CP and filterability of biodiesel marginally. PPDs are typically composed of low-molecular-weight copolymers and function as crystal growth limiters. They are essentially crystal morphology modifiers which may participate in the early steps of crystallization of the saturated components of biodiesel, even after nucleation, but are able to provide a barrier to further growth, therefore reducing crystal size and limiting crystal aggregation. Ozonized vegetable oil is an example of an efficient PPD found to not interfere in the crystallization of saturated FAMEs, but works by modifying the crystal morphology of the unsaturated FAMEs of biodiesel.

SUMMARY

The present disclosure relates to compositions comprising crystallization modifiers (such as TAGs and oligomers of TAGs with two fatty acids in the cis-configuration and a saturated fatty acid or a fatty acid in the trans-configuration) and pour point depressants to improve the cold flow properties of biodiesel fuels.

The present disclosure relates to biodiesel compositions which improve cold flow properties of the biodiesel. In one embodiment, the disclosure includes a biodiesel composition comprising:
  (i) a biodiesel fuel;
  (ii) a polymeric pour point depressant; and
  (iii) a crystallization modifier comprising:
    (a) a triacylglycerol, or dimer thereof, having at least one unsaturated fatty acid in the sn-1 and/or sn-3 position, and (b) at least one saturated fatty acid in the sn-2 position;
    (b) a self-methathesized vegetable oil; or
    (c) a cross-metathesized vegetable oil.

The present disclosure also includes a method of improving the cold flow properties of biodiesel fuels, for example, reducing the pour point temperature or cloud point temperature of the biodiesel. In one embodiment, the present disclosure includes method for improving the cold flow properties of biodiesel fuels comprising combining a biodiesel fuel with a polymeric pour point depressant and a crystallization modifier comprising: (a) a triacylglycerol, or dimer thereof, having at least one unsaturated fatty acid in the sn-1 and/or sn-3 position, and (b) at least one saturated fatty acid in the sn-2 position; (b) a self-methathesized vegetable oil; or (c) a cross-metathesized vegetable oil.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

Figure 3A:
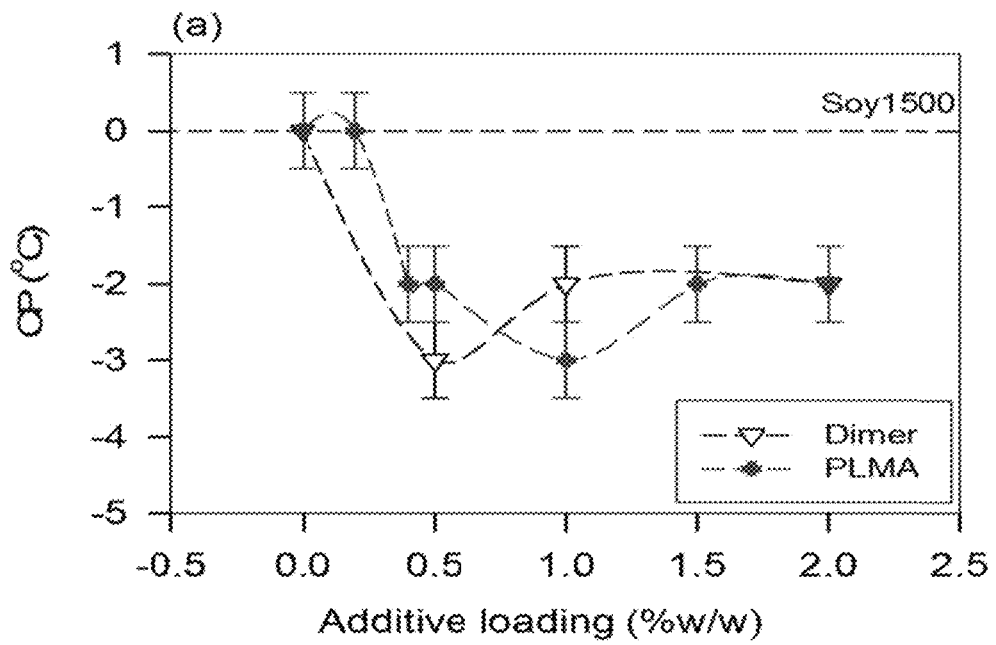
Figure 3B:
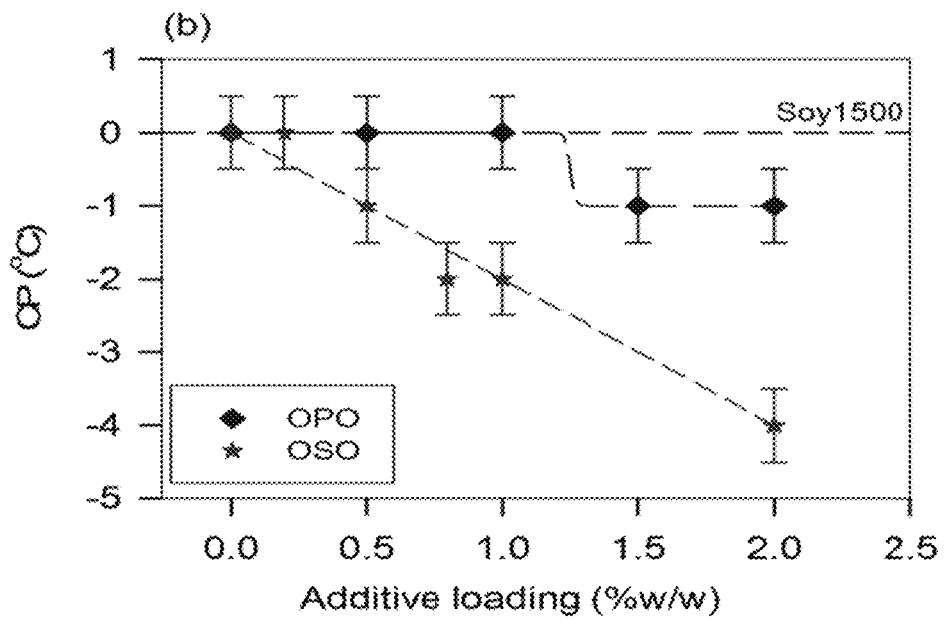

FIG. 3A depicts cloud point (CP) versus concentration of Compound D dimer and PLMA additives in Soy 1500 biodiesel in one embodiment of the disclosure. FIG. 3B depicts cloud point (CP) versus concentration of OSO and OPO additives in Soy 1500 biodiesel in one embodiment. FIG. 3C depicts cloud point (CP) versus concentration of MSBO and PMTAG additives in Soy 1500 biodiesel in one embodiment.

FIG. 4 depicts the cloud point (CP) of Soy1500 supplemented with selected concentration of vegetable oil based crystallization modifiers (VOCMS) additives without PLMA (0% w/w PLMA, stars) and with 0.2% w/w PLMA (empty circles) in one embodiment of the disclosure.

Figure 5A:
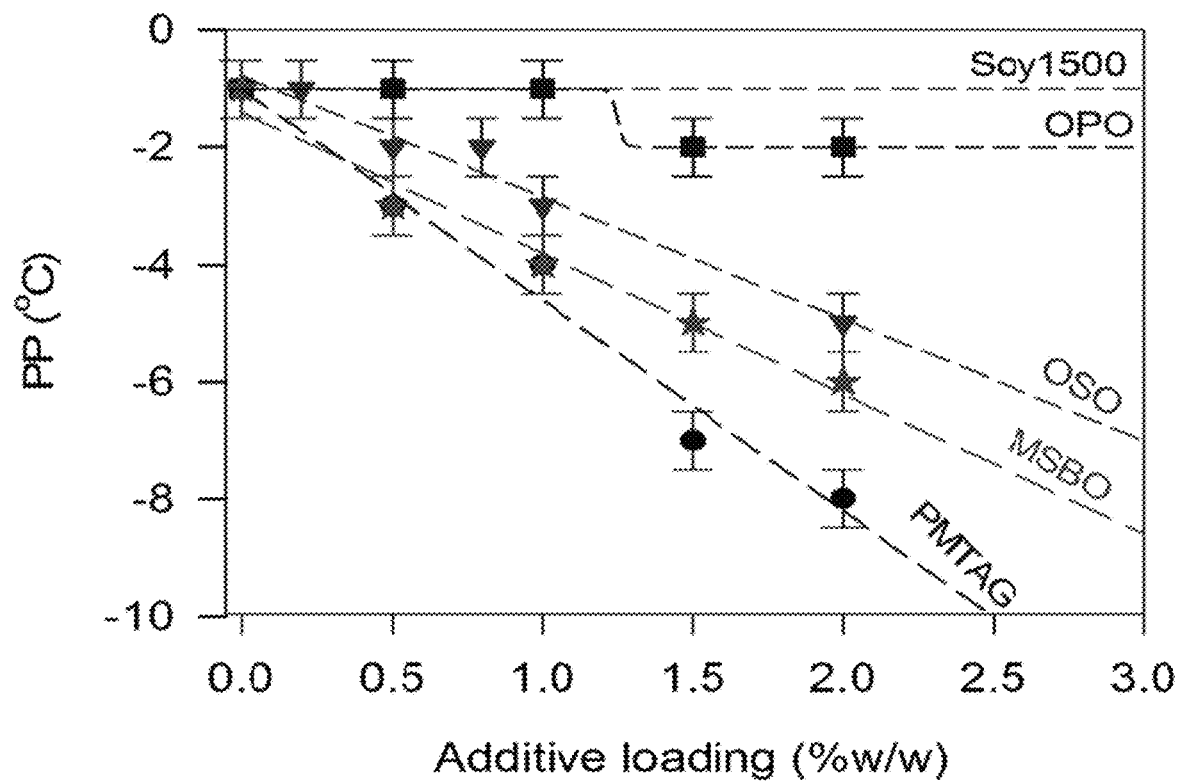
Figure 5B:
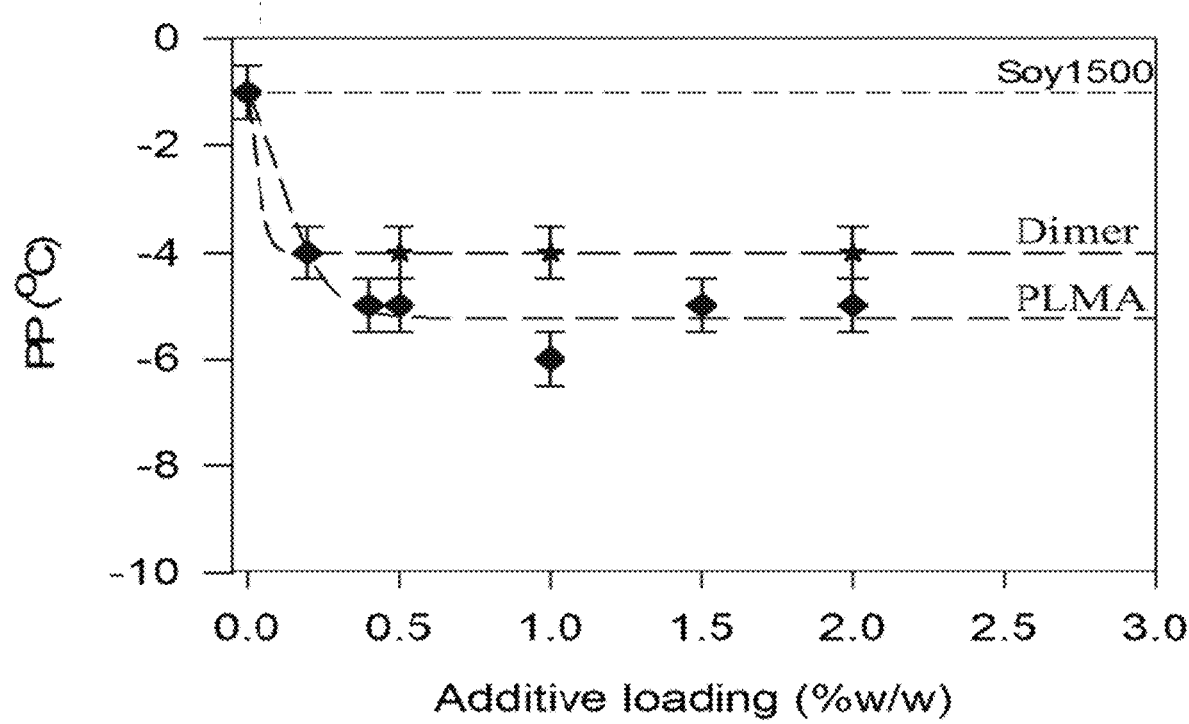

FIG. 5A depicts pour point (PP) of Soy1500 versus concentration curves of PMTAG, MSBO, OSO and OPO in one embodiment. Dashed lines are guides for the eye. FIG. 5B depicts pour point (PP) of Soy1500 versus concentration curves of the Compound D dimer and PLMA. Dashed lines are guides for the eye.

Figure 6:
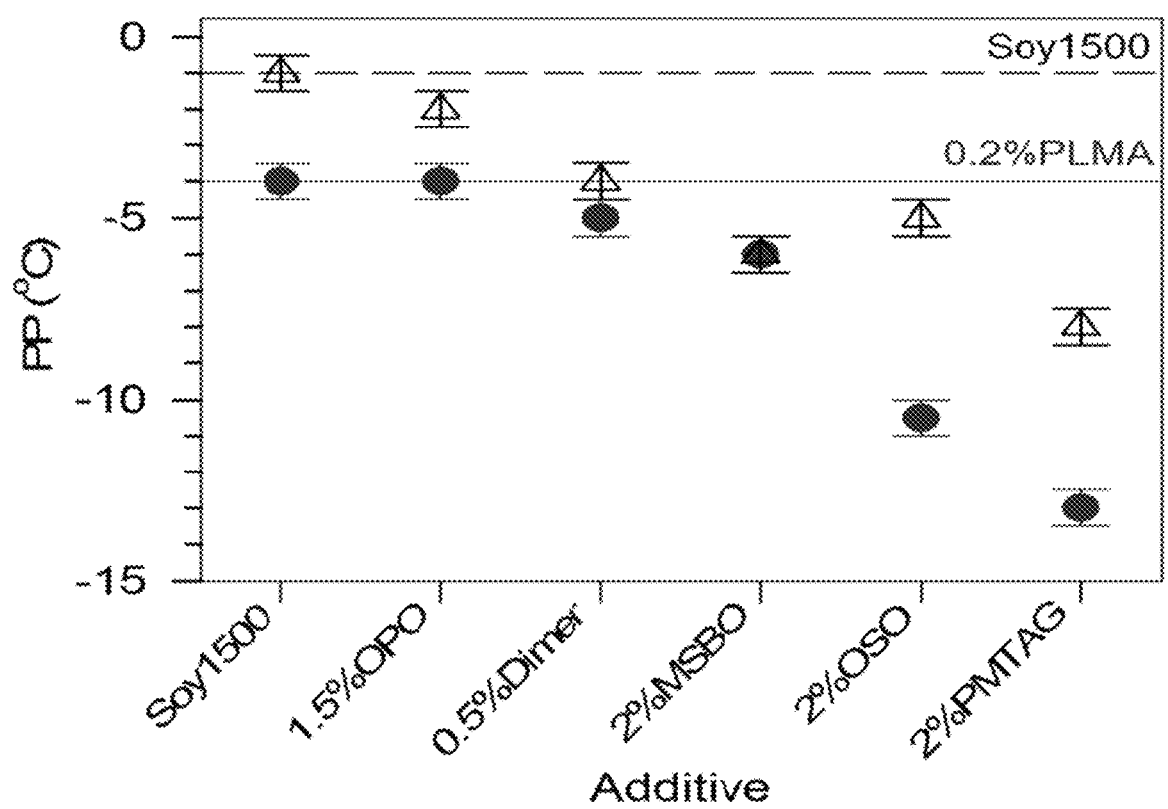

FIG. 6 depicts pour point (PP) of Soy1500 supplemented with vegetable oil based crystallization modifiers (VOCMS) alone (up triangles), and with cocktails of 0.2% w/w PLMA and the VOCM additives (solid circles) in one embodiment.

Figure 7A:
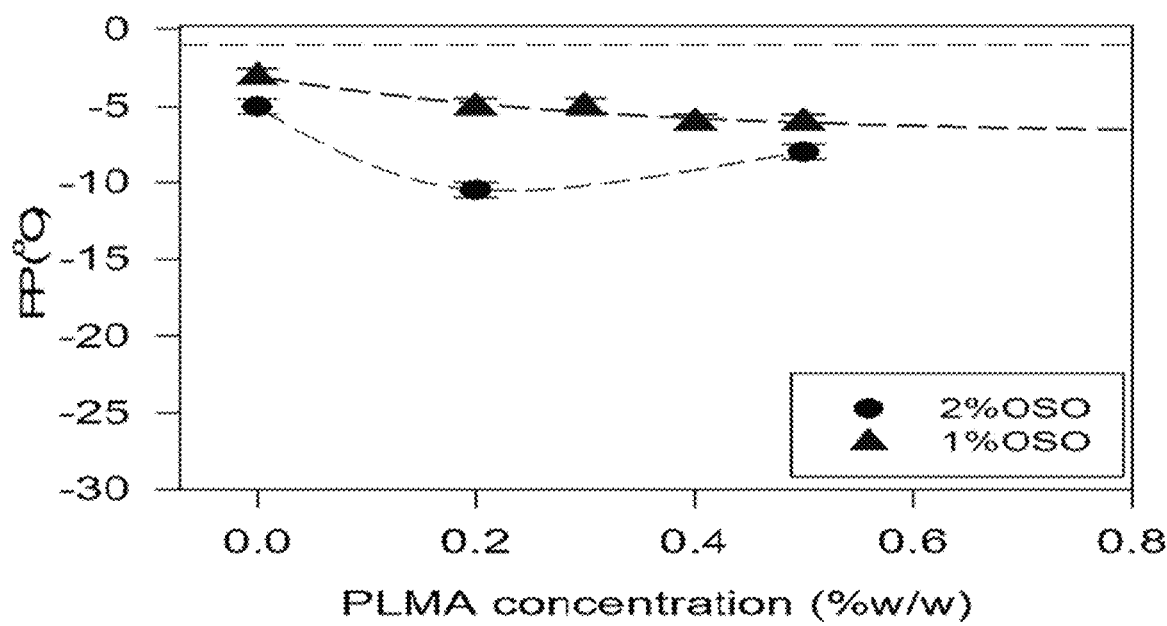
Figure 7B:
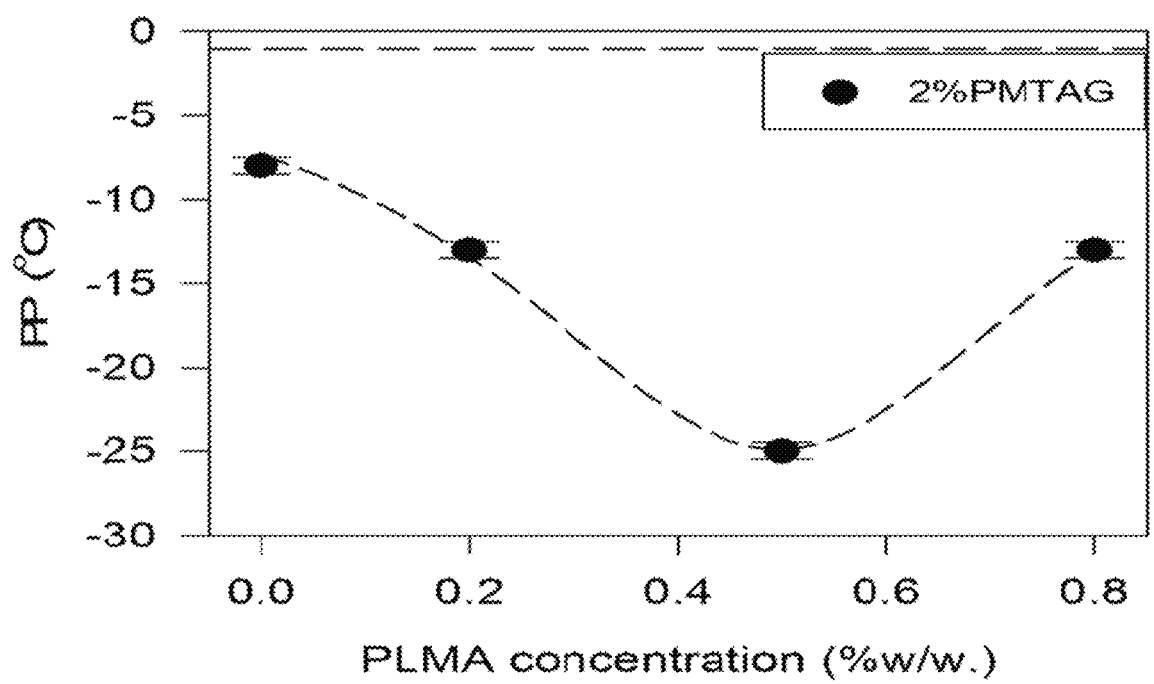

FIG. 7A depicts pour point (PP) of Soy1500 supplemented with PLMA and OSO cocktail additives in one embodiment. Loading of OSO fixed at 1% w/w and 2% w/w and varying PLMA concentration. Upper horizontal line is the PP of Soy1500 biodiesel, and dashed lines passing through the data points are guides for the eye. FIG. 7B depicts pour point (PP) of Soy1500 supplemented with PLMA and PMTAG cocktail additives. Loading of PMTAG fixed at 2% w/w and varying PLMA concentration. Upper horizontal line is the PP of Soy1500 biodiesel, and dashed lines passing through the data points are guides for the eye.

Figure 1:
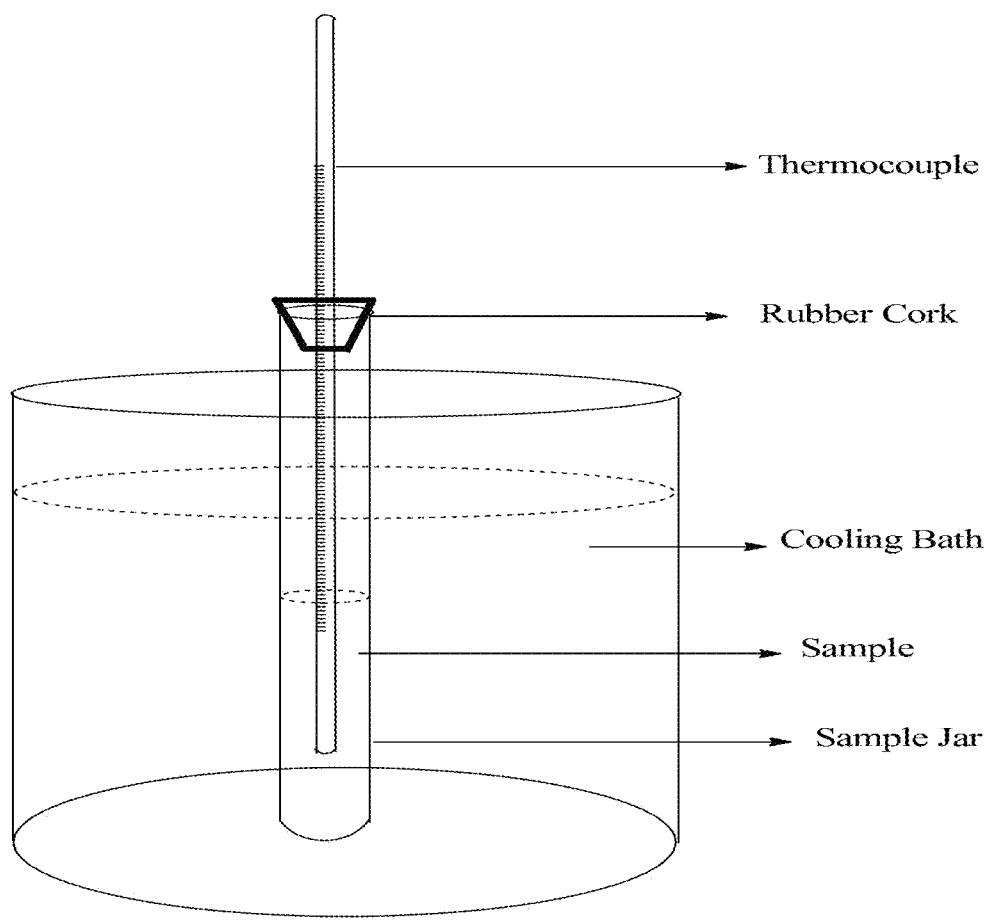
FIG. 1 depicts an apparatus for cloud point and pour point measurements.
Figure 8A:
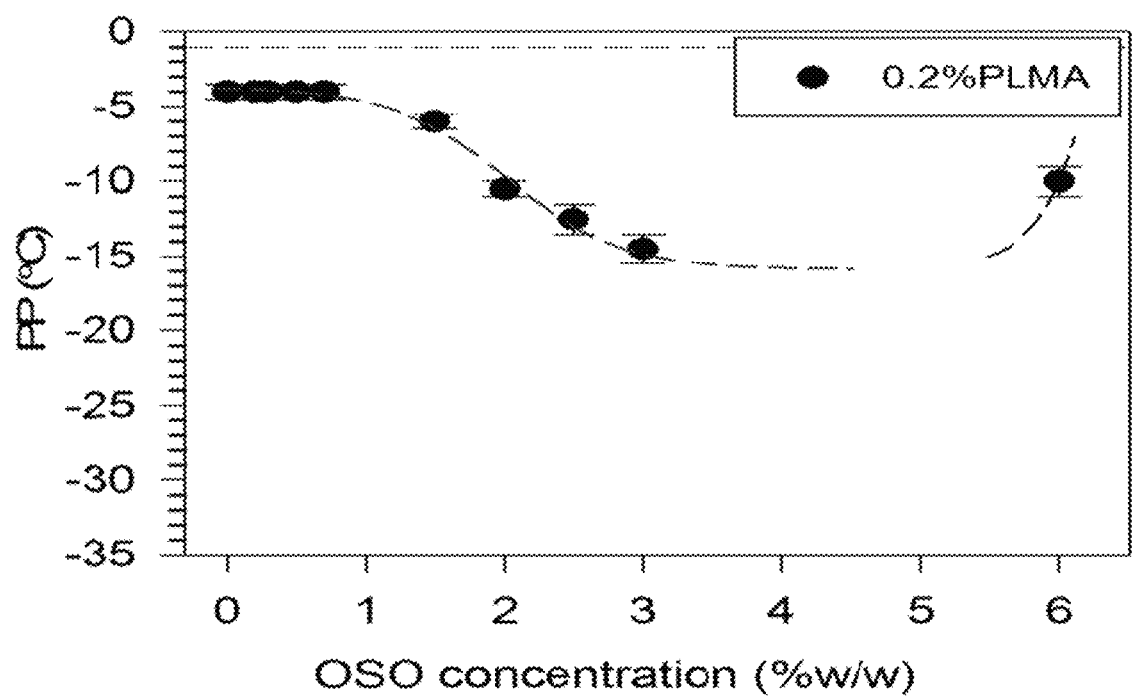
Figure 8B:
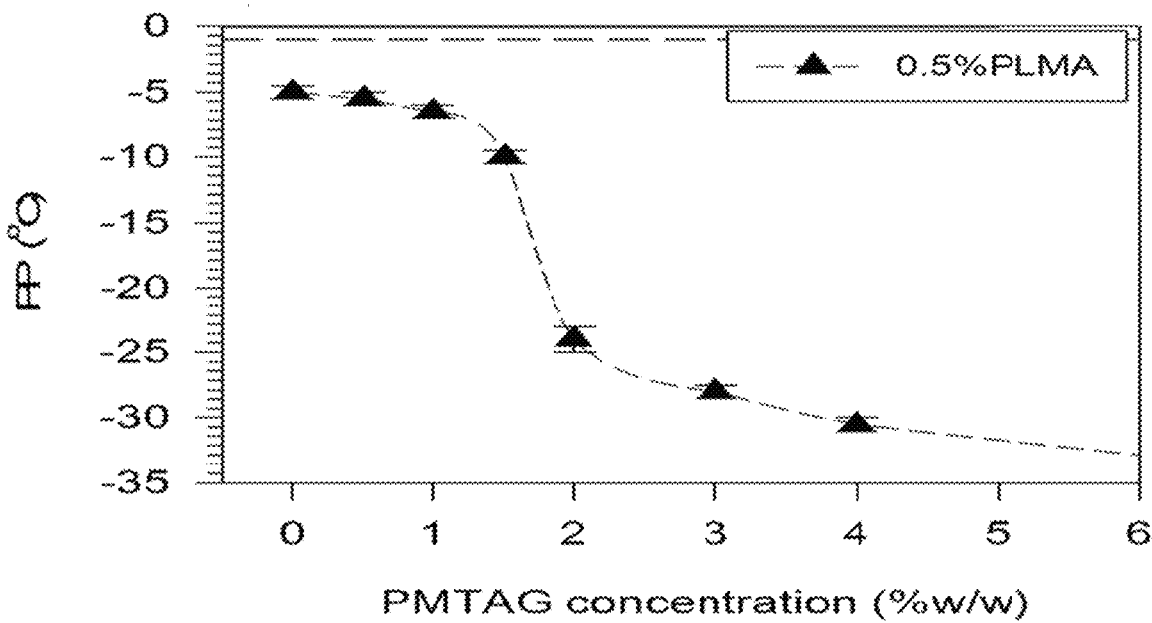
Figures 1, 8:
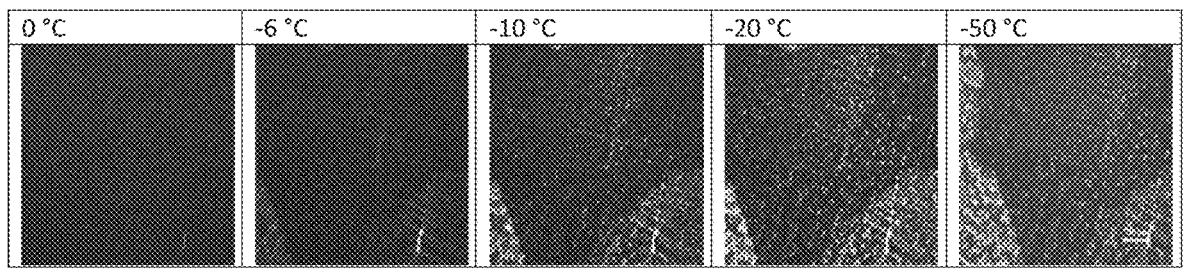

FIG. 8A depicts pour point of Soy1500 supplemented with PLMA and OSO cocktail additives with loading of PLMA fixed at 0.2% w/w and varying OSO concentration in one embodiment. Upper horizontal line is PP of Soy1500 biodiesel, and dashed lines passing through the data points are guides for the eye. FIG. 8B depicts pour point of Soy1500 supplemented with PLMA and PMTAG cocktail additives with PLMA loading fixed at 0.5% w/w and varying PMTAG concentration in one embodiment. Upper horizontal line is PP of Soy1500 biodiesel, and dashed lines passing through the data points are guides for the eye. FIG. 8-1 depicts microstructure development of pure Soy1500. The images were taken while cooling the sample from the melt at 3° C./min.

FIG. 9 depicts PLM of mixtures of Soy1500 and selected additives taken at −50° C. after cooling from the melt at 3° C./min in one embodiment. The concentration of additives is provided on the top of each image. The average characteristic dimensions of the microstructures (in μm) are provided below the images. The uncertainty attached is the standard deviation from all the distinguishable microstructures of the slides of at least two runs.

Figure 10:
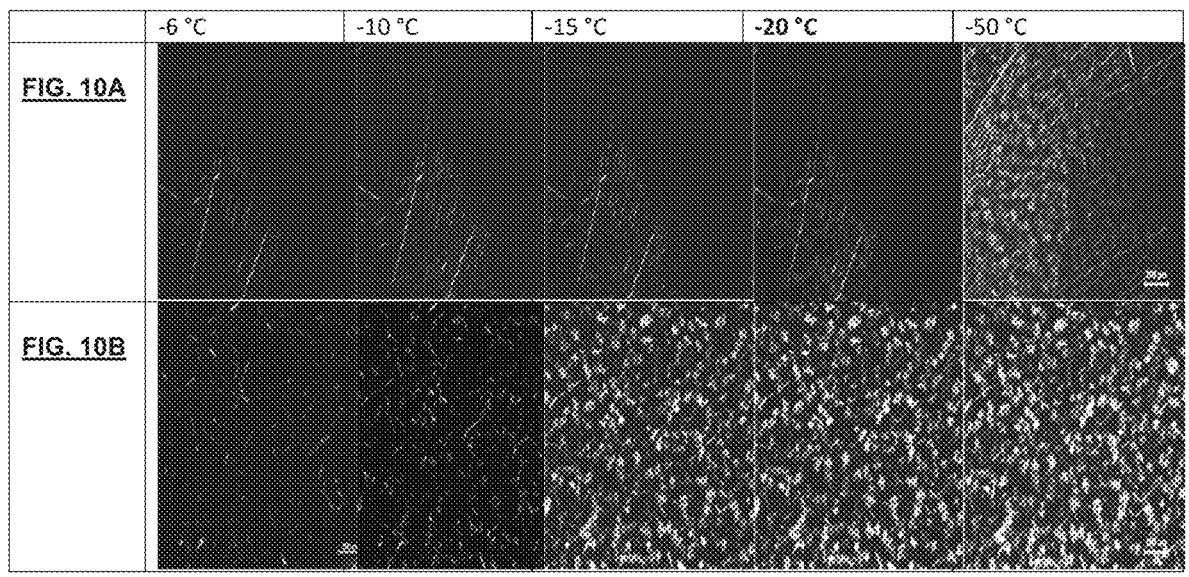

FIG. 10A depicts microstructure development of Soy1500 biodiesel supplemented with 1.5% w/w OPO in one embodiment. Images were taken at different temperatures while cooling from the melt at a rate of 3° C./min. The temperatures were reported on the top of each image. FIG. 10B depicts microstructure development of Soy1500 biodiesel supplemented with 2% w/w OSO. Images were taken at different temperatures while cooling from the melt at a rate of 3° C./min in one embodiment. The temperatures were reported on the top of each image.

Figure 11:
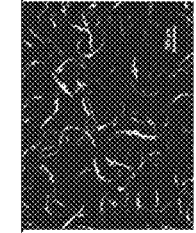
Figures 11A, 11B:
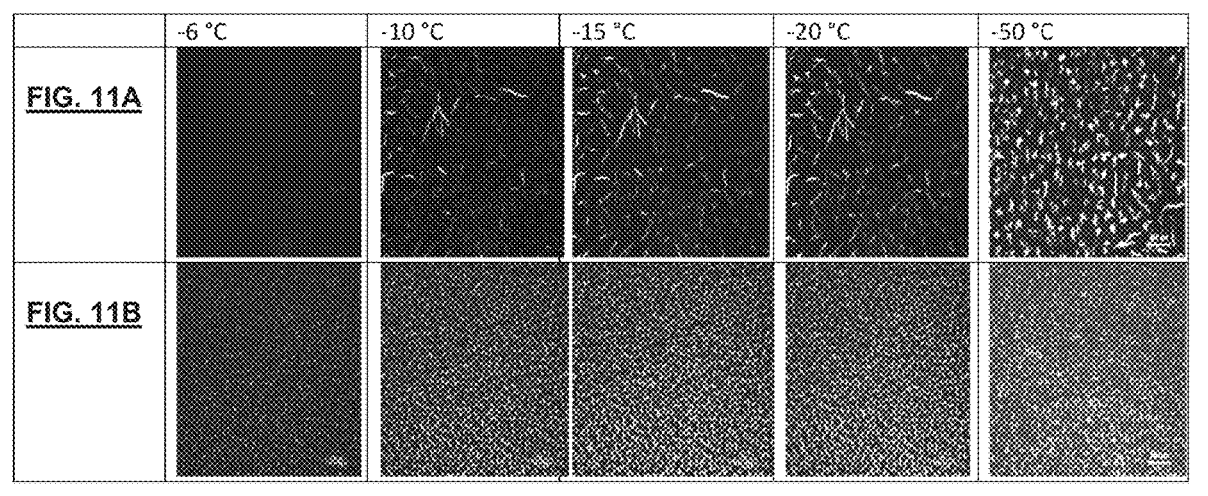
Figure 12:
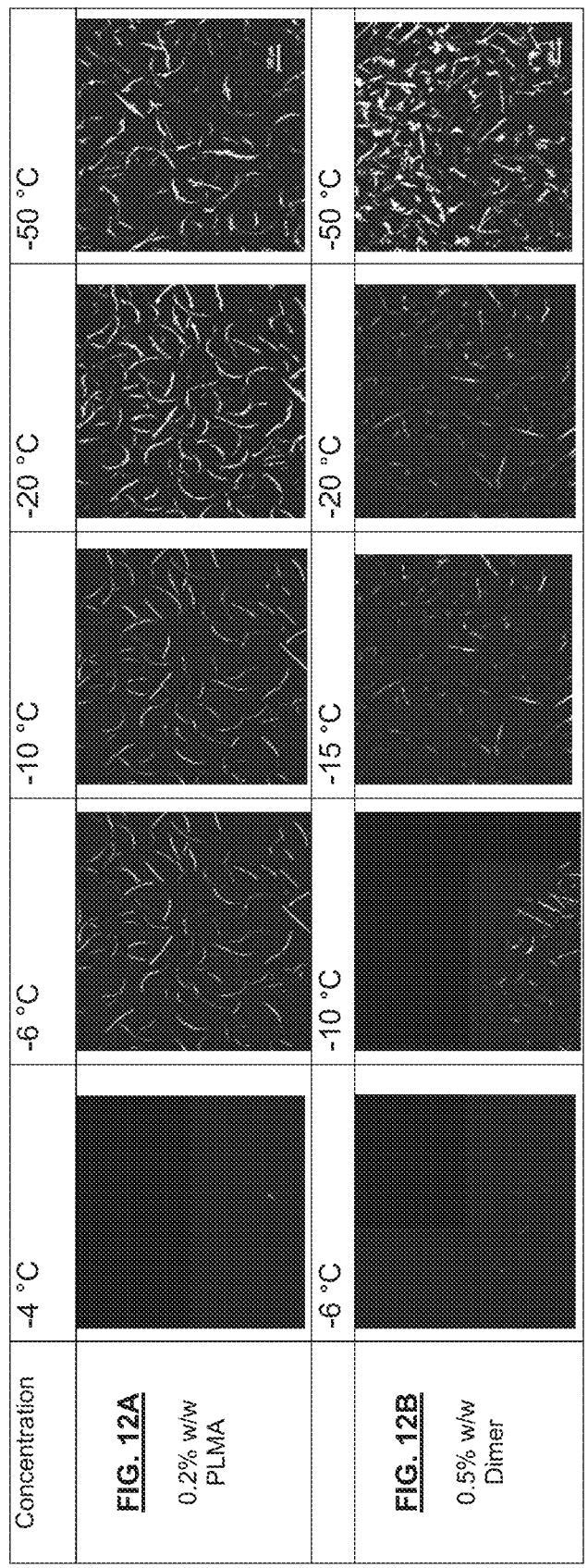

FIG. 11A depicts microstructure development of Soy1500 biodiesel supplemented with (a) 2% w/w MSBO in one embodiment. Temperature of images capture during cooling (3° C./min) from the melt provided on top of the images. FIG. 11B depicts microstructure development of Soy1500 biodiesel supplemented with 2% w/w PMTAG. Temperature of images capture during cooling (3° C./min) from the melt provided on top of the images. FIG. 11-1A depicts time-resolved PLM of Soy1500 with 0.2% PLMA. FIG. 11-1B depicts time-resolved PLM of Soy1500 with 0.5% PLMA in one embodiment. FIG. 11-1C depicts time-resolved PLM of Soy1500 with 2% PLMA. For FIG. 11-1, images were taken at different temperatures while cooling from the melt at a rate of 3° C./min. The temperatures were reported on the top of each image FIG. 12A depicts time-resolved PLM of Soy1500 biodiesel with 0.5% w/w PLMA. Images were taken at different temperatures while cooling from the melt at a rate of 3° C./min in one embodiment. The temperatures were reported on the top of each image. FIG. 12B depicts time-resolved PLM of Soy1500 biodiesel with 0.5% w/w Dimer. Images were taken at different temperatures while cooling from the melt at a rate of 3° C./min in one embodiment. The temperatures were reported on the top of each image.

Figure 13:
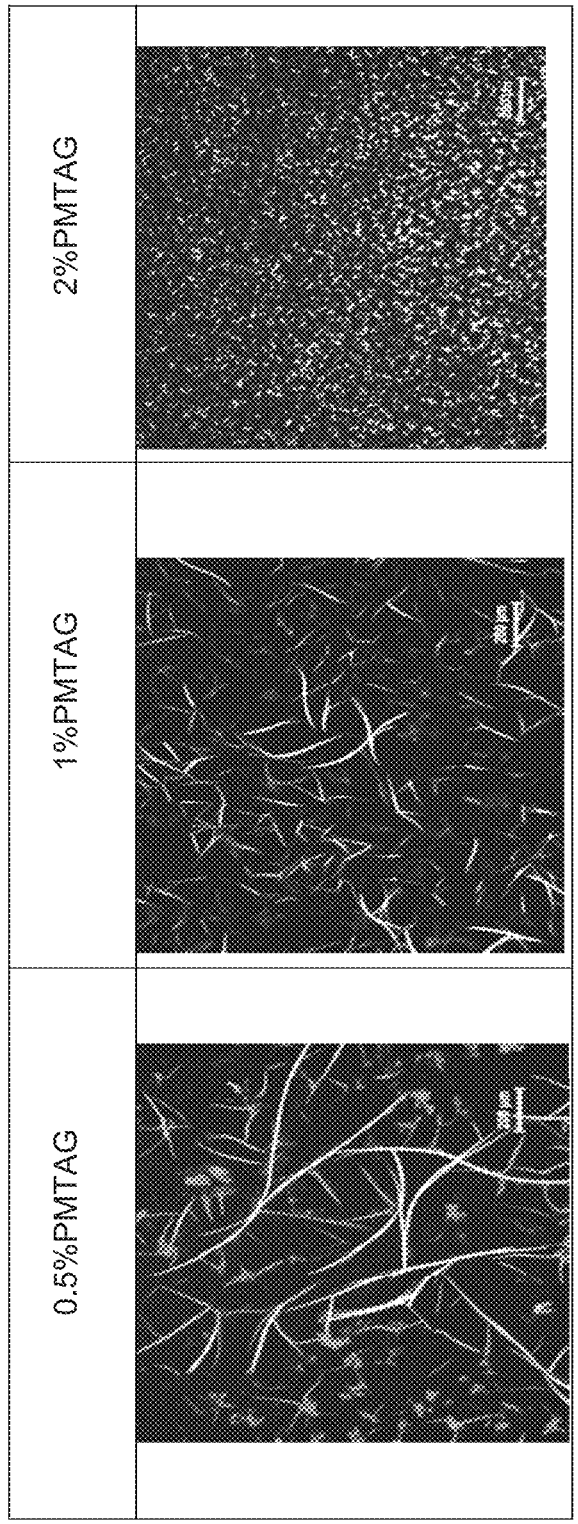

FIG. 13 depicts microstructure development of Soy 1500 biodiesel supplemented with 0.5, 1.0 and 2% w/w PMTAG concentration in one embodiment. Images were taken at −50° C. after cooling from the melt at 3° C./min.

FIG. 14 depicts PLM taken at −50° C. after cooling from the melt at 3° C./min of Soy1500 biodiesel with VOCM additives alone and with the VOCM and PLMA in one embodiment. The concentration of the VOCM additive is provided on the left side of the PLM images. The average characteristic dimensions of the microstructures (in μm) are provided below the images. The uncertainty attached is the standard deviation from all the distinguishable microstructures of the slides of at least two runs.

FIG. 15A depicts PLM images of Soy1500 with binary cocktails 2% w/w OSO taken at −50° C. in one embodiment. The samples were cooled at 3° C./min. FIG. 15B depicts PLM images of Soy1500 with binary cocktails of 0.2% w/w PLMA and 2% w/w OSO taken at −50° C. in one embodiment. The samples were cooled at 3° C./min. FIG. 15C depicts PLM images of Soy1500 with binary cocktails of 0.2% w/w PLMA and 2.5% w/w OSO taken at −50° C. in one embodiment. The samples were cooled at 3° C./min. FIG. 15D depicts PLM images of Soy1500 with binary cocktails of 0.2% w/w PLMA and 3% w/w OSO taken at −50° C. The samples were cooled at 3° C./min.

Figure 16A:
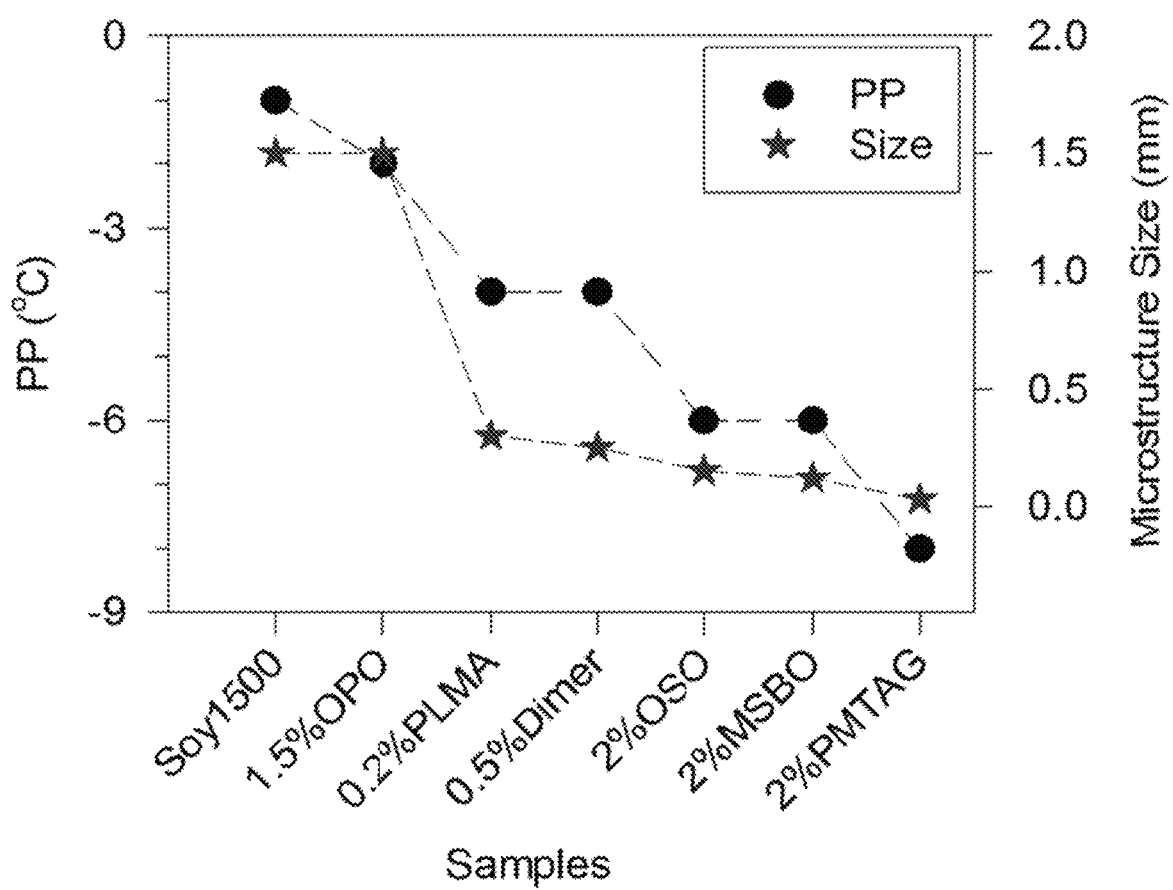
Figure 16B:
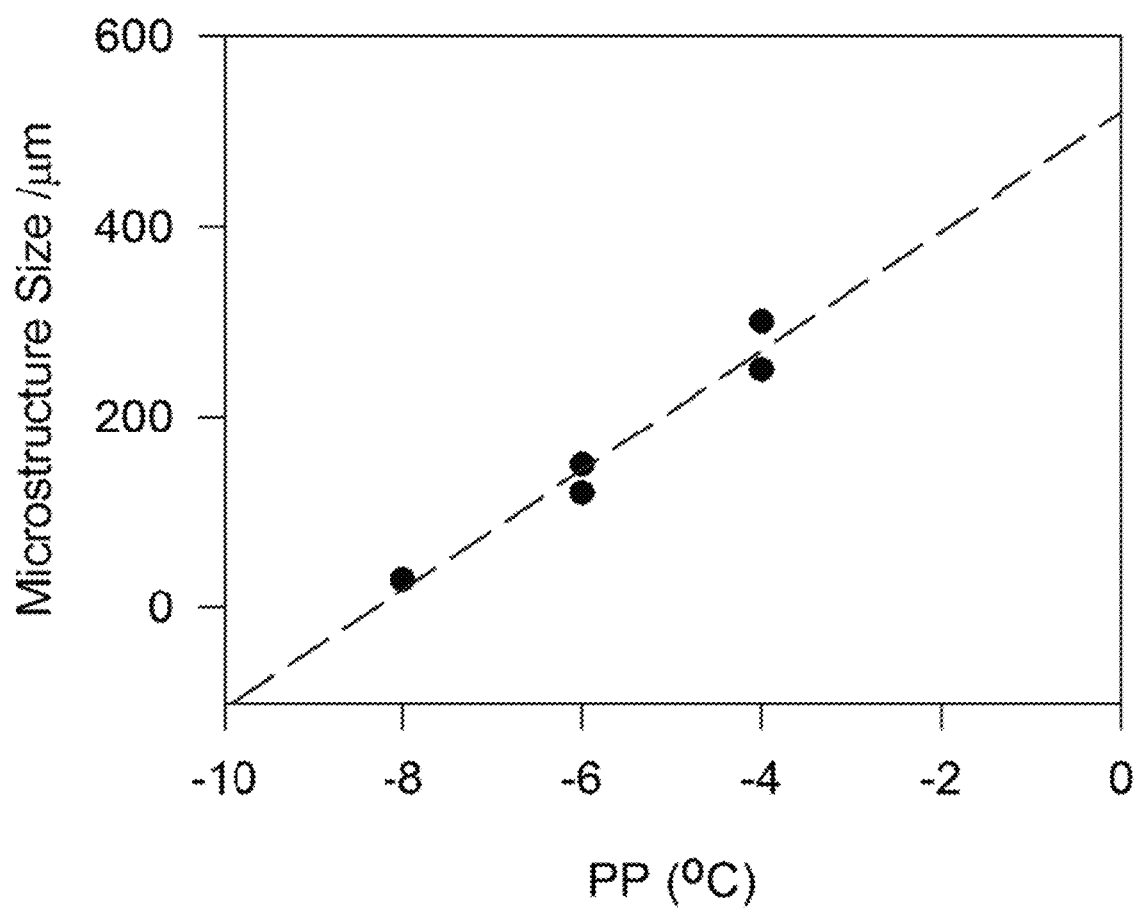

FIG. 16A depicts pour point, and average microstructure size determined using PLM for selected mixtures in one embodiment. FIG. 16B depicts pour point versus average microstructure size in one embodiment.

DESCRIPTION OF VARIOUS EMBODIMENTS (I) Definitions

Unless otherwise indicated, the definitions and embodiments described in this and other sections are intended to be applicable to all embodiments and aspects of the present application herein described for which they are suitable as would be understood by a person skilled in the art.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this application and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation from 0% to at least ±5% of the modified term if this deviation would not negate the meaning of the word it modifies.

The present description refers to a number of chemical terms and abbreviations used by those skilled in the art. Nevertheless, definitions of selected terms are provided for clarity and consistency.

As used in this application, the singular forms "a", "an" and "the" include plural references unless the content clearly dictates otherwise. For example, an embodiment including "the polymer" should be understood to present certain aspects with one polymer or two or more additional polymers.

The term "and/or" as used herein means that the listed items are present, or used, individually or in combination. In effect, this term means that "at least one of" or "one or more" of the listed items is used or present.

(II) Compositions and Methods of the Disclosure

The present disclosure relates to biodiesel compositions which improve cold flow properties of the biodiesel. In one embodiment, the disclosure includes a biodiesel composition comprising:
  (i) a biodiesel fuel;
  (ii) a polymeric pour point depressant; and
  (iii) a crystallization modifier comprising:
    (a) a triacylglycerol, or dimer thereof, having at least one unsaturated fatty acid in the sn-1 and/or sn-3 position, and (b) at least one saturated fatty acid in the sn-2 position;
    (b) a self-methathesized vegetable oil; or
    (c) a cross-metathesized vegetable oil.

In one embodiment, the biodiesel fuel comprises at least one saturated, monounsaturated, or polyunsaturated fatty acid methyl ester or ethyl ester.

In one embodiment, the at least one saturated, monounsaturated, or polyunsaturated fatty acid methyl ester is selected from the group consisting of methyl palmitate, methyl laurate, methyl myristate, methyl caprate, methyl linoleate, methyl linolenate, methyl oleate, methyl stearate, methyl arachidate, and methyl behenate, individually or combinations thereof.

In one embodiment, the polymeric pour point depressant is an alkyl or aryl methacrylate. In one embodiment, the alkyl or aryl methacrylate is lauryl methacrylate, alkyl(12, 13)-methacrylate, alkyl(C16)-methacrylate, stearyl methacrylate, alkyl(C22)-methacrylate, cyclohexyl-methylacrylate, isodecyl methacrylate, 2-ethylhexylmethacrylate, isobornyl methacrylate, or polylauryl-methacrylate (PLMA). In one embodiment, the alkyl or aryl methacrylate is polylauryl-methacrylate (PLMA).

In one embodiment, the at least one unsaturated fatty acid comprises a $C_3$-$C_{36}$ monounsaturated or polyunsaturated fatty acid.

In one embodiment, the at least one unsaturated fatty acid is selected from the group consisting of butenoic, pentenoic, hexenoic, pentenoic, octenoic, nonenoic acid, decenoic acid, undecenoic acid, dodecenoic acid, tridecenoic, tetradecenoic, pentadecenoic, palm itoleic, oleic, ricinoleic, vaccenic, linoleic, linolenic, eicosapentaenoic, behenic and erucic acids.

In one embodiment, the at least one saturated fatty acid is a $C_3$-$C_{36}$ saturated fatty acid.

In one embodiment, the at least one saturated fatty acid is selected from the group consisting of propionic, butyric, valeric, caproic, enanthic, caprylic, pelargonic, capric, undecylic, lauric, tridecylic, myristic, pentadecanoic, palmitic, margaric, stearic, nonadecyclic, arachidic, heneicosylic, behenic, tricosylic, lignoceric, pentacoyslic, cerotic, heptacosylic, carboceric, montanic, nonacosylic, melissic, lacceroic, psyllic, geddic, and ceroplastic acids.

In one embodiment, the dimer of a TAG has the following general structure

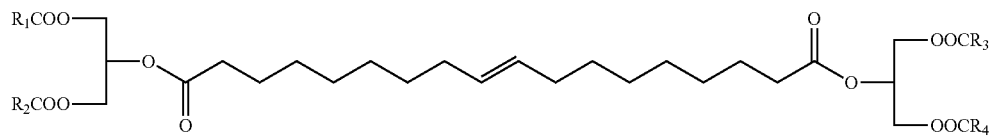

wherein the R groups are as defined for the TAG.

In one embodiment, the triacylglycerol comprises is 1,3-dioleoyl-2-stearoyl-sn-glycerol (OSO), 1,3-dioleoyl-2-palmitoyl-sn-glycerol (OPO), or a dimer of OSO or OPO.

In one embodiment, the dimer of OPO has the structure

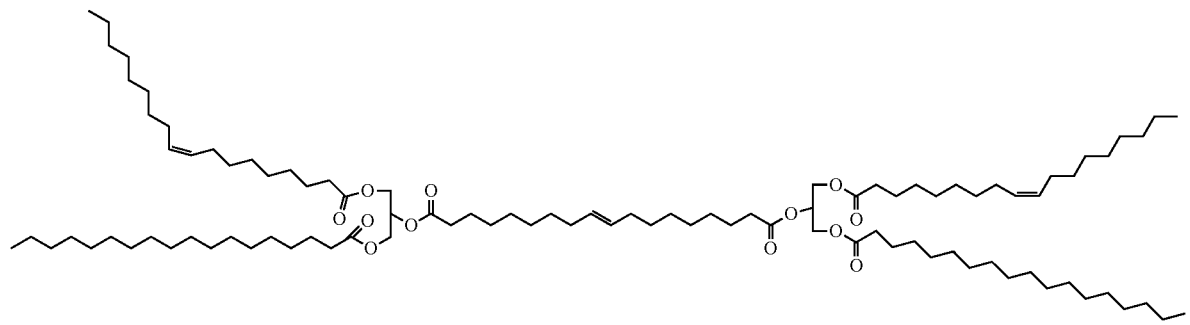 [SMILES: CCCCCCCC/C=C\CCCCCCCC(=O)OCC(COC(=O)CCCCCCCCCCCCCCCCC)OC(=O)CCCCCCC/C=C/CCCCCCCC(=O)OC(COC(=O)CCCCCCC/C=C\CCCCCCCC)COC(=O)CCCCCCCCCCCCCCCCC]

In one embodiment, the self-metathesized vegetable oil is self-metathesized soybean oil (MSBO) and has the structure

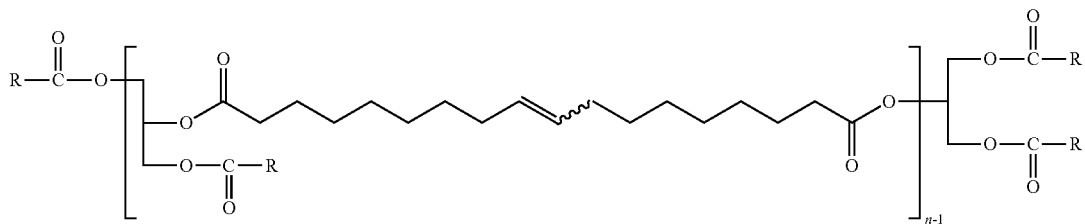

wherein
each R is independently or simultaneously a fatty acid chain derived from oleic acid, linoleic acid, linolenic acid, stearic acid or palmitic acid, wherein the double bonds in each of the fatty acid chains is cis or trans; and
n is the integer 1, 2, 3, 4 or 5.

In one embodiment, the cross-metathesized vegetable oil is cross-metathesized palm oil and has one of the following structures:

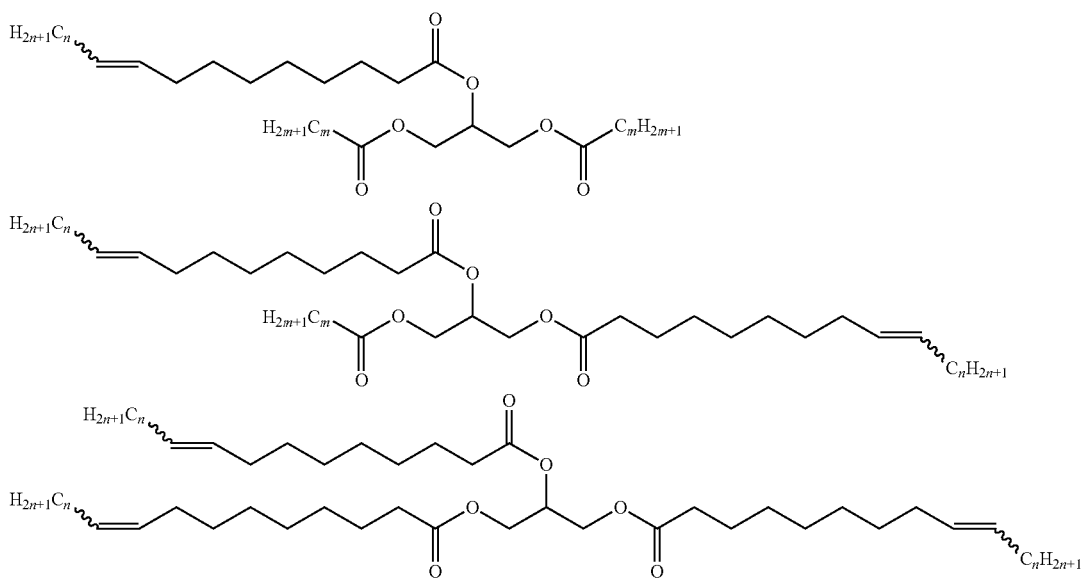

wherein n is the integer 0, 2 or 8, and m is an integer from 11 to 20.

In one embodiment, the polymeric pour point depressant is present in the biodiesel composition at an amount of at least about 0.05% (w/w). In one embodiment, the polymeric pour point depressant is present in the biodiesel composition at an amount of at least about 0.2% (w/w). In another embodiment, the polymeric pour point depressant is present in the biodiesel composition at an amount of about 0.05% (w/w) to about 3.0% (w/w), or about 0.05% (w/w) to about 3.0% (w/w), or about 0.05% (w/w) to about 1.0% (w/w), or about 0.05% (w/w) to about 0.8% (w/w), or about 0.05% (w/w) to about 0.5% (w/w).

In one embodiment, the crystallization modifier is present in the biodiesel composition at an amount of at least about 0.5% (w/w). In one embodiment, the crystallization modifier is present in the biodiesel composition at an amount of at least about 2.0% (w/w). In one embodiment, the crystallization modifier is present in the biodiesel composition at an amount of about 0.5% (w/w) to about 5.0% (w/w), or about 0.5% (w/w) to about 3.0% (w/w), or about 0.5% (w/w) to about 2.0% (w/w).

In one embodiment, the composition decreases the pour point temperature of the biodiesel fuel (compared to without the additives) by at least about 9° C. In one embodiment, the composition decreases the pour point temperature of the biodiesel fuel by at least about 15° C.

In one embodiment, the polymeric pour point depressant is PLMA present in an amount of about 0.2% (w/w), and the triacylglyercol is OSO present at an amount of about 3.0% (w/w) to about 5.0 (w/w), and wherein the composition decreases the pour point temperature of the biodiesel fuel by at least about 15° C.

In one embodiment, the polymeric pour point depressant is PLMA present in an amount of about 0.1% (w/w) to about 2.0% (w/w), and the crystallization modifier is cross-metathesized palm oil present at an amount of about 0.5% (w/w) to about 5.0% (w/w), and wherein the composition decreases the pour point temperature of the biodiesel fuel by at least about 30° C.

In one embodiment, the size of microstructures in the biodiesel composition at −50° C. are decreased from about 1500 μm (without the additives present) to about 30 μm when the additives are present.

The present disclosure also includes a method of improving the cold flow properties of biodiesel fuels, for example, reducing the pour point temperature or cloud point temperature of the biodiesel. In one embodiment, the present disclosure includes method for improving the cold flow properties of biodiesel fuels comprising combining a biodiesel fuel with a polymeric pour point depressant and a crystallization modifier comprising: (a) a triacylglycerol, or dimer thereof, having at least one unsaturated fatty acid in the sn-1 and/or sn-3 position, and (b) at least one saturated fatty acid in the sn-2 position; (b) a self-methathesized vegetable oil; or (c) a cross-metathesized vegetable oil.

EXAMPLES

The following non-limiting examples are illustrative of the present application:

The present effort investigated an alternate solution where these effects can be achieved through synergistic actions of a CPD and a PPD. It follows a series of investigations of natural oil based crystallization modifiers (VOCMs) sourced from self-metathesized soybean oil (MSBO). MSBO and components of MSBO such as TAGs and oligomers of TAGs with two fatty acids in the cis-configuration and a saturated fatty acid or a fatty acid in the trans-configuration were found to be highly functional crystallization depressors. These VOCMs although highly effective in lowering the onset of crystallization of biodiesel and decreasing crystal size, did not significantly alter the PP.

PLMA was chosen as the PPD to be tested in combination with VOCMs selected from the most effective compounds determined in a previous study in our laboratory (listed in Table 1 below). The VOCMs include pure compounds such as 1,3 dioleoyl 2-stearoyl sn-glycerol (OSO), 1,3 dioleoyl 2-palmitoyl sn-glycerol (OPO), and (E)-1-(1-(oleoyloxy)-3-(stearoyloxy)propan-2-yl) 18-(1-(oleoyloxy)-3-(stearoyloxy) propan-2-yl) octadec-9-enedioate, a dimer of OPO (referred to as Dimer, Compound D dimer, or dimer of OPO), and complex mixtures such as self-metathesized soybean oil (referred to as MSBO) and cross-metathesized palm oil (referred to as PMTAG). Each VOCM was tested individually and in combination with PLMA. A method inspired by ASTM D97 and ASTM D2500 was specially designed to measure CP and PP of the biodiesel mixtures much more precisely. In order to uncover the mechanism of action and the role of concentration or particular structural features that favor synergetic effects, the mixtures were also investigated with DSC and PLM.

Note that measurement of PP and CP of biodiesel with methods other than ASTM D97 and ASTM D2500 is not unusual. Some of these methods are reported to be even better than the ASTM method.

Materials and Methods of Preparation

Materials

Soy 1500 is a mixture of FAMEs derived from soybean oil, donated by AG Environmental products, L.L.C, USA. The fatty acid methyl ester (FAME) composition of Soy1500 as determined by GC is presented in Table 2. The non-polymer additives were all derived from vegetable oil. Their IUPAC names and structures are provided in Table 1. They are referred to as vegetable oil crystallization modifiers (VOCMs). The structured TAGs OSO, OPO, and the dimer of OPO-Dimer, were synthesized in our laboratory according to known methods. Self-metathesized soybean oil (MSBO), and metathesized palm oil (PMTAG) were provided by Elevance Renewable Sciences (ERS, Bolingbrook, Ill., USA). MSBO is the product of self-metathesis of soybean oil, and PMTAG is the product of cross-metathesis of palm oil with 1-butene, both stripped of short aliphatic olefinic components. MSBO consists of structured TAGs such as OSO, OPO, SOO, etc. and oligomers of these TAGs such as dimers and quatrimers PMTAG consists of the saturated unmodified TAGs of palm oil and modified TAGs including shortened TAGs at the level of the double bond as well as trans-isomers. PMTAG polyol was synthesized by epoxidation and hydroxylation. PLMA, the polymer additive, was purchased from Scientific Polymer Products, USA, as a solution in toluene. Toluene was removed from PLMA using rotary evaporation followed by vacuum drying for a week The mixtures were prepared by weighing the required amount of additives in a glass vial and then adding to Soy1500. When PLMA was present, it was weighed first. Because PLMA does not dissolve in the biodiesel at room temperature, the mixtures containing PLMA were heated to 50° C. for 5 min then homogenized with Soy 1500 using a vortex (Fisher Scientific, Canada) for 5 min. The other mixtures were homogenized at room temperature using the vortex for 2 min. Six different mixtures with loadings between 0 and 2% by wt. (% w/w) were prepared for each individual additive. Note that because the concentration of the additives is expressed in weight % all along the text, reference to weight in the designation of the mixtures will be dropped from here on.

Methods

Pour Point and Cloud Point Measurement

Pour point and cloud point of samples, were measured using a setup designed in our laboratory. The equipment was developed based on ASTM D-97 and ASTM D-2500 and uses similar methods to measure CP and PP.

The Apparatus

The apparatus is shown in FIG. 1. It consists of a temperature controlled cooling/heating circulator (Julabo F50-ME, Julabo USA Inc.) used as a cooling bath, and comply with ASTM D97 recommendations. The sample jar is a 1.5×15 cm glass test tube (Pyrex, SciLabware, Stoke-on-Trent, UK) fitted with a type K thermocouple attached to a data logger (Temp-300 Dual-Input, OAKTON Instruments, Vernon Hills, Ill., USA) that records the temperature of the sample continuously. The thermocouple is placed at mid fill level and maintained rigidly in place by a rubber cork. Another thermocouple also attached to the data logger was immersed in the cooling bath to record its temperature. A stand was specially designed to allow for the quick and smooth testing operations. A vertical metallic bar securely fixed to the heavy base of the stand was fitted with two tight but easy release claps to hold the sample tube with the thermocouple still during the thermal processing of the sample and quick release and replacement for measurement. A regular thermometer was used to double check the temperature of the bath regularly. Ice point (−0.5° C. with the thermometer used) was checked prior to each experiment. The sample and bath temperature was determined to better than ±0.1° C.

Figure 2:
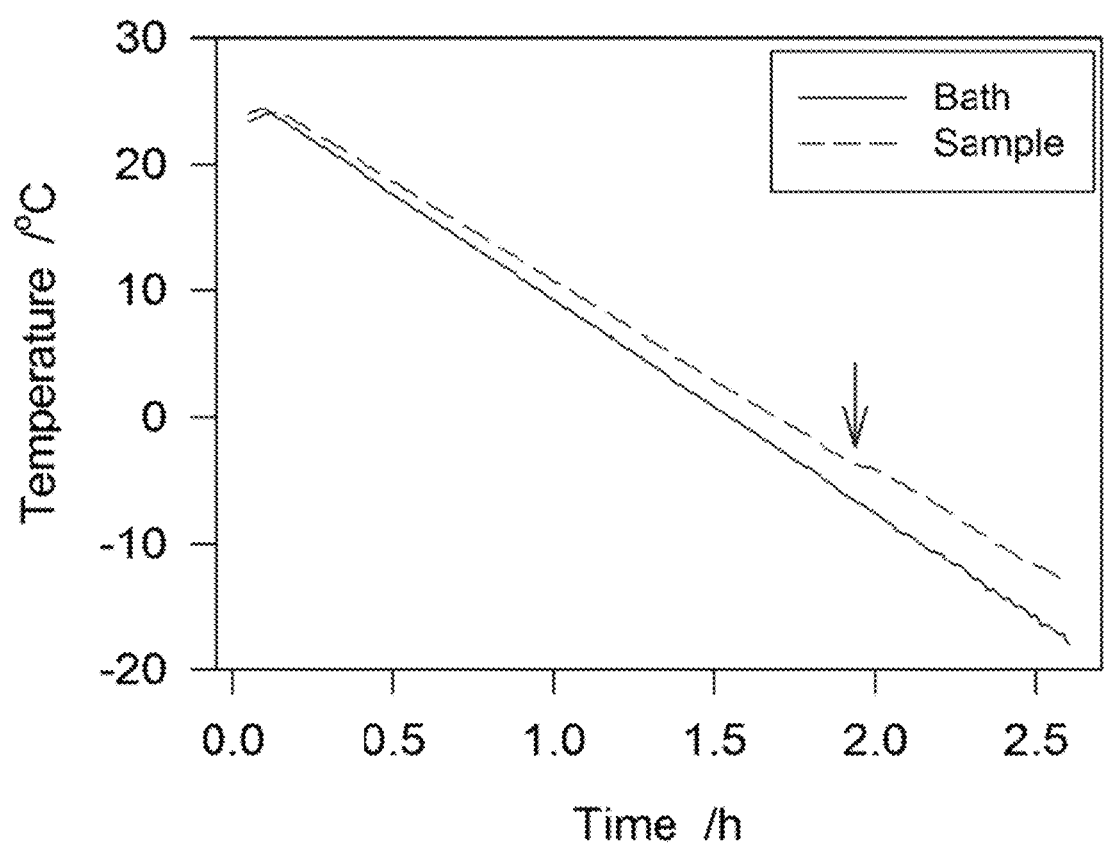
FIG. 2 depicts temperature versus time curves of the cooling bath and sample (Soy1500+0.2% w/w PLMA+2.5% w/w OSO in one embodiment of the disclosure) measured simultaneously.

The Cloud Point and Pour Point Measurement Procedure:

A sample of 8 ml in the test jar is cooled directly in the circulating thermal bath. The sample is equilibrated at 25° C. for 5 min to erase the thermal history than cooled at ~0.3° C./min. Such a slow cooling ensured crystallization conditions closer to equilibrium and a homogeneous distribution of the temperature in the sample. The direct contact of the test jar with the thermal bath ensured a better control of the sample temperature than what is obtained with the jacketed system of ASTM D97. The present method also avoids some of the common sources of errors in the ASTM methods such as those due to the fluctuations in the air density and humidity As exemplified with the cooling profiles of the cooling bath and Soy1500 supplemented with 0.2% w/w PLMA and 2.5% w/w OSO presented in FIG. 2, the temperature of the sample decreases fairly linearly and closely followed the bath temperature. One can even notice the singularity in the sample temperature at the point where it started to crystallize (arrow in FIG. 2).

The sample was visually examined for the presence of any crystal at least 10° C. above the expected CP of the material. The sample tube was quickly removed from the bath and checked and then placed back. The whole process was performed in less than five (5) seconds and was repeated every 1° C. The CP was recorded as the temperature at which the first crystal is observed. At this stage the sample jar was tilted horizontally and the sample checked for flow. The process was repeated until no movement was observed. The PP was recorded as the temperature at which the sample showed the latest movement. Note that as recommended by the ASTM procedure, the sample was kept undisturbed while inspecting the presence of crystals, and the sample jar was not tilted until CP was recorded. The measurement temperature was determined to better than ±0.5° C.

Polarized Light Microscopy

Microstructure analysis of selected mixtures was conducted using a polarized light microscope (PLM, Leica DM2500P, Leica Microsystems, Wetzlar, Germany) fitted with a Leica (DFC420C) digital camera. A temperature-controlled stage (Linkam LS 350, Linkam Scientific Instruments, Tadworth, Surrey, UK) fitted to the PLM was used to process the samples thermally. A small droplet of material was carefully pressed between a preheated glass microscope slide and cover-slip ensuring a uniform thin layer of sample. The sample was melted at 25° C. for 5 min to delete all crystal memory then cooled at 3° C./min down to −50° C. Temperature/time resolved images of the sample were collected using the automatic multi-time image capture available in the PLM. The appearance of the first "white spot" in the PLM was recorded as the start temperature of crystallization or induction temperature ($T_{ind}$).

Polarized Light Microscopy (PLM) is an efficient technique to study the microstructure of lipid systems. The development of fat crystals from the start of crystallization to the complete fat network can be exposed by time/temperature resolved PLM, or thermo-microscopy. The technique also allows access to nucleation parameters when the rate of nucleation is low or the rate of crystal formation (number of crystals per time) is low, i.e., when individual crystals can be individually counted and considered as nuclei.

Effect of the Additives on the Cloud Point of Soy1500 Biodiesel

The CP of biodiesel supplemented individually with additives is displayed in FIG. 3. The maximum depression CP values obtained with single treatment of additives are provided in Table 3.

In FIG. 3, the presence of additives all lowered the CP of Soy1500. The CP of Soy1500 versus concentration curves presented a minimum at −3° C., corresponding to a depression of 3° C. at 1% w/w loading for PLMA, PMTAG and MSBO (FIGS. 3A and 3C) and 0.5% w/w for Dimer (down triangles in FIG. 3A). OSO depressed the CP of Soy1500 linearly (−2.09° C. per % w/w, $R^2$=0.9747), achieving a depression of 4° C. at 2% w/w loading. OPO affected CP of Soy1500 only marginally, starting at 1.5% w/w loading with a small depression of 1° C. The depression in CP of biodiesel caused by the VOCMs used here compares favorably with those observed for other CFI additives reported in the literature. Depression in CP achieved using 2% w/w OSO compared favorably with the results obtained using complex lipid based structures such as branched diesters; CP was reduced by 0.7 to 5.3° C., at loadings between 1% w/w and 10% w/w by volume.

The CP of Soy1500 supplemented with a cocktail made of the VOCMs at their most effective concentrations and 0.2% w/w PLMA was measured in order to determine possible compounding effects. The results are presented in in FIG. 4. The corresponding depressions are listed in Table 3. As shown in FIG. 4, except with PMTAG and MSBO where a small decrease (1° C.) was observed, PLMA combined with other VOCMs did not change CP of Soy1500. The effect of PLMA on the CP was small when present and does not seem to affect the way the VOCMs work. The small effect observed with the metathesized products was likely due to the complex composition of MSBO and PMTAG which may have comprised molecules that introduced a concentration effect. The effect was not investigated further as it was not germane to the study at hand, and very small for the complex mixtures Effect of Individual Additive on the Pour Point of Soy1500

The effect of the individual VOCMs (MSBO, OSO, OPO and PMTAG) on PP of Soy1500 is shown in FIG. 5A. The effect of the Dimer and PLMA is presented in FIG. 5B. These are singled out in different panels to highlight their peculiar behavior. The PP and the depression in PP of biodiesel with selected concentrations of additives are also provided in Table 4.

All the additives depressed the PP of the biodiesel significantly. The magnitude of depression, however, depended on the nature and concentration of the additive. Addition of PMTAG, MSBO and OSO up to 2% w/w reduced PP of Soy1500 nearly linearly ($R^2$>0.9755, dashed lines in FIG. 5A. At any given concentration, PMTAG affected PP the most with a depression of 3.6° C. per % w/w, followed by MSBO with 2.4° C. per % w/w and OSO with 2.1° C. per % w/w. OPO affected PP of Soy1500 only marginally, starting at 1.5% w/w loading with a small reduction of 1° C. (i.e., from −1° C. to −2° C.

The effectiveness of PLMA and the Dimer was limited to very low loadings (FIG. 5B). The polymer additive, PLMA, achieved its highest effect on the PP of Soy1500 with a depression in PP of 4° C., from −1° C. to −5° C., at a loading of 0.4% w/w, then plateaued afterwards. The Dimer followed the same trend with a depression of 3° C., from −1° C. to −4° C., at 0.5% w/w loading. This close similarity in action on PP mirror the similarity observed in CP and suggests that the attributes of a PPD in terms of its action on biodiesel may start with a dimeric structure. This particular Dimer showed a phase diagram with methyl palmitate, wherein it displayed a eutectic at very low concentration and a stepwise increase in its most stable phases for higher concentrations. Note that at corresponding low loadings, the Dimer and PLMA were more effective than all the other additives.

The VOCMs used in this study achieved comparable or better performance than other bio-based PPDs found in literature. At a loading of 2% w/w PMTAG displayed a depression in the PP of Soy1500 similar to 1.5% w/w of ozonized sunflower oil in soybean oil biodiesel. Other bio based PP additives depressed PP at significantly higher concentrations, such as ethyl levulinate which depressed the PP of cotton seed biodiesel and poultry fat biodiesel by 4° C. at 20% by vol. or ethyl acetoacetate which depressed the PP of cotton seed biodiesel by 4° C. at the same loading of 20% by volume.

Note that PMTAG, although derived from palm oil, had a significantly greater effect on the PP of Soy1500 than MSBO, a product derived from soybean oil.

Effect of PLMA Combined with Individual Additives on the Pour Point of Soy1500

In order to test for synergy effects between PLMA and the VOCMs, cocktail mixtures made with 0.2% w/w PLMA, the smallest efficacious load observed for the PPD alone, and the VOCMs at the concentrations which achieved the largest PP depression, i.e., 1.5% w/w OPO, 0.5% w/w Dimer, 2% w/w MSBO, 2% w/w OSO and 2% w/w PMTAG (see FIG. 5A) were tested on Soy1500 for PP.

FIG. 6 shows the data comparing the effect on PP of Soy1500 of the individual VOCMs and cocktail additives made of 0.2% w/w PLMA and VOCM. Overall, the additive which showed the highest effect on PP without PLMA showed also the highest effect with PLMA. As can be seen in FIG. 6, the combination of 0.2% w/w PLMA with OPO did not enhance the efficacy of either additive. The PP of Soy1500 in this case was that obtained with 0.2% w/w PLMA alone, as if OPO did not take part in the disruption process. The polymer probably interfered with the crystallization process after the formation of OPO/biodiesel crystals, when all OPO was spent. MSBO, and the Dimer at a lesser extent, also did not present synergistic effects with 0.2% w/w PLMA. It is probable that these levels of PLMA loadings were not sufficient to add to the effect of these VOCMs. The synergy with OSO and PMTAG was very marked. For both VOCMs, the combination with PLMA resulted in a further drop in PP of Soy1500 by 5° C. When combined with 0.2% w/w PLMA, 2% w/w OSO decreased the PP of Soy1500 to −10.5° C., i.e., a depression of 9.5° C., much higher than the 4.0° C. depression achieved by 2% w/w OSO alone. Also, the 0.2% w/w PLMA+2% w/w PMTAG, decreased the PP of Soy1500 to −13.0° C., which is a 5.0° C. improvement to the depression of 7° C. that was achieved by PMTAG alone.

Optimization of PLMA Combined with Individual Additives: Part I

In order to investigate the combined effect of polymer and non-polymer additives, PLMA was combined with the selected VOCM (OSO and PMTAG) in a systematic manner. In the preliminary investigations, the VOCM concentration was fixed and PLMA concentration was varied to determine the optimal PLMA loading. The pure TAG, i.e., OSO, was selected for more extensive preliminary investigation instead of PMTAG to avoid probable interference effects that might occur with complex compositions. FIG. 7A shows the effect on the PP of Soy1500 of cocktail mixture of OSO at fixed concentration (1% w/w and 2% w/w shown) and varying PLMA concentration.

For FIG. 7A, the combination of PLMA with 1% w/w OSO plateaued at 0.4% w/w-0.5% w/w PLMA with a depression in PP of 5° C. PLMA worked most efficiently with 2% w/w OSO, the concentration that achieved the highest depression in PP when OSO was used individually. As can be seen also in FIG. 7A, the optimal PLMA concentration was 0.2% w/w with a maximum depression of 9.5° C. Such an optimum in the action of PLMA is not surprising as polymer additives are known to be less effective at high loading.

A similar approach was followed to find the optimal PLMA loading in combination with PMTAG. 2% w/w PMTAG was chosen as the fixed VOCM because it achieved the highest PP depression in the experiments which investigated the effect of individual additives (see FIG. 5A). The results of the effect of 2% w/w PMTAG and varying PLMA concentration are shown in FIG. 7B. As can be seen in the figure, an optimum was obtained at 0.5% w/w PLMA, a value quite different from what was obtained with OSO. Furthermore, a much larger depression of 25° C. in the PP (from −1° C. to −26° C.) of Soy1500 was obtained with this combination. Note that the depression in PP of about 10° C. achieved by the optimum mixture in the case of OSO (0.2% w/w PLMA and 2% w/w OSO) was lower even than what was achieved with the 0.2% w/w PLMA and 2% w/w PMTAG cocktail mixture (12° C.).

Optimization of PLMA Combined with Individual Additives: Part II

In a second set of experiments, PLMA concentration was fixed at the optimal values determined previously, and the concentration of the VOCM was varied from 0 to 6% w/w. The PP of Soy1500 results obtained by adding OSO with 0.2% w/w PLMA are shown in FIG. 8A, and those with PMTAG and 0.5% w/w PLMA are shown in FIG. 8B. The PP of biodiesel was depressed by both combinations. OSO combined with 0.2% w/w PLMA decreased PP to as low as −16° C. (a depression of 15° C.) for OSO concentrations between 3% w/w and 5% w/w, after which CP increased to −10° C., a depression of 9° C., with 6% w/w OSO.

The metathesized product of palm oil achieved a much more dramatic decrease in the PP of Soy1500, where a rather exceptional depression of −30° C. was obtained with the mixture of 4% w/w PMTAG and 0.5% w/w PLMA.

The trend observed in the depression (inverse of the trend shown in FIGS. 8A and 8B) are those of multiplicative effects. It is characterized by an elongated S-shaped, or sigmoid curve typical of so-called "population growth rate" trends, followed by a capping effect. It is very similar to an "augmentation" pattern of population density that increases slowly initially, then increases rapidly, approaching an exponential rate; but then, as limiting factors are encountered, declines in a negative acceleration phase until a limit is approached asymptotically. This type of growth is termed density-dependent. The point of stabilization, or zero rate, is termed the saturation value (symbolized by K) or carrying capacity of the environment for that entity. K represents the upper asymptote of the sigmoidal or S-shaped curve. A tentative fit to a sigmoidal function of the S-shaped segment of the PP depression curve due to OSO with PLMA yielded a saturation value K=15.8° C. ($R^2$=0.99693). The capping of the effect at 6% w/w OSO can be attributed to "increasing environmental resistance" analogous to "population limiters".

The tentative fit to one sigmoidal function of the S-shaped segment of the PP depression curve due to PMTAG with PLMA was not successful, understandably, as it notably showed the superposition of more than one sigmoid. Its fit to two superimposed sigmoidal functions yielded saturation values K=19.0° C. and 33.6° C. ($R^2$=0.99993). The estimation obtained with the available data indicated that with the 0.5% w/w PLMA+PMTAG cocktails one can achieve a depression 4° C. larger if not more than what was obtained with the 0.5% w/w PLMA+4% w/w PMTAG.

Microstructure Development of Mixtures of Biodiesel with Different Additives Effect of Single Additives on the Microstructure of Biodiesel The time resolved PLM (as shown in FIG. 8-1) showed that pure Soy1500 developed fibril like entities from a center of nucleation which grew radially, very rapidly, into a very large distorted crystal (~1500 µm) as the temperature was decreased. This microstructure development was reminiscent of the crystallization of pure saturated FAMEs MeS and MeP in previous studies. While cooling, several branches grew from these fibrils, forming a network in which the remaining liquid phase was trapped. The trapped fuel started crystallizing within the network below −10° C. as small granules on the fibrils. The microstructure observed for Soy1500 was the result of a rapid crystallization of the saturated FAMEs forming a continuous solid network in which the trapped liquid unsaturated FAMEs crystallized as the temperature was decreased.

FIG. 9 shows the final microstructure of biodiesel with selected concentrations of VOCMs. As can be seen, the additives altered the microstructure of the crystallized biodiesel and considerably reduced the crystal size (crystal size of the mixtures is provided below the images of FIG. 9). The original fibrils were reduced into elongated worm-like or platelet-like entities. As illustrated clearly in the PLMs of FIG. 9, the type, shape and size of the microstructures depended on the type and concentration of additive.

Effect of the Structured TAGs on the Microstructure

The time resolved PLM of Soy1500 with 1.5% w/w OPO (FIG. 10A) revealed that OPO affected the microstructure of the fuel at the earliest stages of crystallization. OPO in fact prevented the radial growth of the crystals and allowed the development of long thin fibrils indicating a strong directional growth. Furthermore, OPO prevented the branching of the fibrils contrary to what was observed in Soy1500 alone. The remaining liquid phase in the system started to crystalize at −9° C. giving small granular microstructures and leading to a final microstructure that was similar in many aspects to that of pure Soy1500. The growth rate of the fibrils was similar to that of the radial microstructure of Soy1500, indicating that it was the saturated FAMEs that were involved in this development. The PLM reveals that OPO was involved primarily with the saturated FAMEs of Soy1500 as early as the nucleation stage, locking any lateral growth probably via geometric steric hindrance of its kinked oleic moieties. The PLM explains why although OPO disrupts the crystallization of the fuel at both the nucleation and growth stages, particularly its saturated FAMEs, it does not favorably impact the PP. In fact, the solid network that was formed, although different, was formed as rapidly as the one formed by Soy1500 alone.

Time lapse PLMs of the Soy1500 with 2% w/w OSO mixture (FIG. 10B) revealed a different microstructure development than with OPO. In this case, the fuel was not only prevented from crystallizing in the lateral directions but also severely constrained in the longitudinal direction. As a result, a large number of small platelet-like microstructures were formed, distributed homogeneously in the liquid phase. More importantly, these entities grew very slowly with decreasing temperature, allowing for the slow crystallization of granular entities on their walls. The development of a critical mass for these entities was necessary to build a gelling network. The delay observed between the formation of the early crystals and a binding solid network explains the large decrease in PP due to OSO. The action of OSO was different from OPO, particularly in suppressing the growth in all directions as indicated by the formation of small platelets instead of long fibrils.

Effect of MSBO and PMTAG on the Microstructure

Microstructure of Soy1500 was also disrupted significantly by the metathesized vegetable oils, MSBO and PMTAG. The microstructure of Soy1500 with MSBO displayed platelet like microstructures (FIG. 11A), randomly distributed in the liquid phase. The microstructure of Soy1500 with PMTAG (FIG. 11B) however displayed very small (30 µm) and dense granular microstructure.

Effect of the TAG Dimer and Polymer on the Microstructure

Time-resolved PLM of the samples with PLMA (FIG. 12A) indicated a continuous nucleation and growth of fibrils first, followed by the formation of very small grainy crystals on the walls of the fibrils. The growth of the fibrils was very rapid reminiscent but relatively slower than the radial growth of the biodiesel or saturated FAMEs. The growth of the fibrils completed at −6° C., just 2° C. below the appearance of the first crystal. The directional growth continued until the small crystals started to appear, indicating that the fastest directional growth, although being slowed down compared to what was observed in the radial growth of the biodiesel, was not totally inhibited by PLMA. The nucleation of the secondary small entities was continuous and their growth was slow.

The correlation between the numbers of fibrils with concentration of PLMA (as shown in FIG. 11-1) and the related decrease in the length of the fibrils with the fact that saturated FAMEs content was constant support a two-step crystallization process arbitrated by PLMA. It is safe to assume that the saturated FAMEs were the molecules that were forming the fibrils and that PLMA was anchored to the other growing surfaces, allowing the directional growth until all the saturated FAMEs of the biodiesel are spent. The nucleation and growth of the small crystals on the walls of the fibrils is associated with the unsaturated FAMEs of the biodiesel. The PLM data indicate that the nucleation and growth rate of these entities was effectively controlled to a large extent by PLMA.

As the time resolved PLM shows, Soy1500 with the dimer mixture also displayed short fibril-like microstructures (FIG. 12B). The effect of the dimer on the microstructure of Soy1500 resembles that of PLMA, suggesting similar mechanisms of action. Similarly, as the sample was cooling, small crystals appeared at the walls of the fibrils but at significantly smaller rates. These entities remained very small even at −50° C. This shows that, PLMA and the Dimer additives inhibited the growth of both saturated and unsaturated FAMEs in the system.

Effect of Concentration of VOCMs on the Microstructure

The microstructure development of Soy1500 depended on the concentration of the additive also. The additive concentration primarily influenced the length of the fibrils and the rate at which the secondary crystals appeared and grew on the walls of the fibrils. The effect of concentration of VOCMs on the microstructure is illustrated very well by the experiments with PMTAG. The microstructures obtained at −50° C. for the samples of Soy1500 supplemented with different amounts of PMTAG are shown in FIG. 13. As can be seen in the figure, long fibrils were obtained with the low concentration of 0.5% w/w PMTAG (FIG. 13A). The fibrils shortened dramatically as the concentration was increased to 1% w/w PMTAG, (FIG. 13B) then became small platelets for 2% w/w PMTAG (FIG. 13).

Effect of Cocktail Additives on the Microstructure of Biodiesel

The effect of the combination of OSO, OPO, Dimer, MSBO and PMTAG with PLMA on the final microstructure of Soy1500 is shown in FIG. 14A-F. The combination of PLMA with the VOCM additive resulted in a decrease of both the length and breadth as well as number density of the microstructures compared to the effects of the VOCM alone.

The VOCM concentration was also a factor in the changes in the microstructure of Soy1500 with the VOCM/PLMA cocktail additives. As exemplified in 15 a-d for the typical case of OSO with 0.2% w/w PLMA, the increase of OSO concentration from 2% w/w to 3% w/w, significantly reduced the microstructure density allowing for a very large oil phase even at very low temperature, such as the −50° C. presented in FIG. 15A-D.

PP and Average Microstructure Size Correlations

The PP and average microstructure size shown in FIGS. 16A and 16B correlate well. The plot of average crystal size versus CP, except OPO for which the crystal size was not measured accurately, yielded nearly linear relationships (FIG. 16B; a=−62.5±0.2 and $y_0$=457.5±1.3, $R^2$=0.9125, W Statistic=0.9552 and Significance Level=0.0500) indicating a strong correlation between the two parameters.

Mechanism of Action of the Additives and Synergy

The combination of a VOCM with a PPD in a cocktail perform more effectively than any single additive, the effect being more pronounced on PP than CP. The effect of the additives manifested by a strong directional inhibition of growth, noticeably reducing the size of the microstructures and delaying the formation of a binding network. The structural features of the additive as well as concentration determined the extent to which the microstructure of the biodiesel was altered and hence the magnitude of CP and PP depressions. The effectiveness of the cocktail additives is correlated to their ability to work synergistically at different length scales, (a) delaying nucleation, (b) preparing the nuclei for an alteration of the microstructure, typically a dramatic reduction of crystal size, and then (c) slowing down the formation of bridges between growing crystals. All the saturated FAMES of the fuel, MeS and MeP in the case of Soy1500, are spent into forming the smallest crystals possible, and the other additives provide the necessary barrier to growth and aggregation of these crystals. Note that although very structure specific, the particular contribution of the VOCM or PPD is not restricted to one of these actions. The ultimate result is the delaying of the formation of a gelling network.

The action of the VOCMs depend on the type of molecular lamellas that they initiate with the saturated FAMEs of the fuel and on the following interactions with its unsaturated molecules. The chain length mismatch (CLM) between the interacting moieties is a determining factor as it determines the methyl end chain interactions at the terrace level for further growth. With a CLM=0, when growth is not hindered, spherulitic microstructures are formed easily. When there is a CLM, due to the missing of atoms there will be a void created on the terrace site of the lamellae, which reduces the lattice cohesion energy. This may interrupt the formation of large microstructures. The results obtained with OPO and OSO TAGs is telling in this regard.

The addition of OSO to Soy1500 resulted in a much more significant depression of PP or CP than OPO despite a strong directional inhibition of growth. This was related to the relative action of OPO and OSO on specific FAMEs composing Soy1500. The usual mere similarity/dissimilarity criteria that explain the disturbance of crystallization as previously reported is not sufficient to justify such stark differences between the actions of OSO and OPO. Both present similar linear features at the sn-2 position compatible with the straight saturated FAMEs and two kinks that prevent further packing. Notably, CLM between the TAG and the FAMEs play a role. In Soy1500 supplemented with OPO or OSO, the one-directional growth was promoted at the detriment of the spherulitic growth which was suppressed. In the case of OPO, the directional growth of long thin fibrils was probably facilitated by methyl-end chain interactions due to chain length mismatch considerations.

The effect of PMTAG on PP can be explained in terms of CLM and position of the double bond considerations. PMTAG consists of modified TAGs of palm oil, in which about 28% of the C18 oleic and linoleic acids were converted into C10 and C12 moieties (9-decenoic acid and 9-dodecenoic acid). In addition to the large CLM, these modified TAGs have terminal double bonds, which are much more strained than the internal double bonds, making a methyl end terrace inadequately suited for an efficient surface of growth. These factors, particularly if in a large collection of molecules with varied structural features, are usually the origin of weak interactions and lead to the formation of small microstructures. Without being bound by theory, PMTAG is an effective VOCM because it is composed of a large number of molecules having an array of structural features that could address appropriately all the FAMEs of the biodiesel.

Unlike PMTAG, MSBO comprises a large number of oligomers of the TAGs of its starting soybean oil that are much less effective than the modified TAGs of PMTAG at arresting growth. MSBO manifested more like PLMA and the dimer with long curved fibrils, indicating that it functions as more of a weak PPD than an effective VOCM.

The action of PLMA and at a lesser extent, the Dimer and MSBO can be understood in light of the mechanism of action formulated for polymer additives. The mechanism as supported by experiments and theoretical molecular modeling is based on the locking of the active growth faces to further growth by the adsorption of the polymer to the growing surface. This mechanism is most efficient when along with a structural similarity, a moderate CLM between the monomer of the polymer and the crystallizing entities was present. In the case of PLMA, the lauric acid moiety is structurally similar to and present small CLMs (4 and 2, respectively) with the MeS and MeP, the saturated FAMEs of Soy1500.

The different additives disrupted different levels of biodiesel crystallization. OPO, OSO, and PMTAG were able to disrupt the crystallization from nucleation and during growth at different extents; whereas, PLMA and Dimer acted as directional growth modifiers. These adsorbed on preferential growing surfaces of the crystals. In the combination VOCM and PLMA additives, the VOCM increased the nucleation rate and number of crystals, and acted as a template for crystallization. This provided increased surface area for the action of the polymer additive, resulting in further disruption of growth and crystal aggregation. Without being bound by theory, the combination is effective when the VOCM disrupted the crystallization and induced the smallest crystals, and the PPD to adsorb in all active surfaces such with PMTAG and PLMA for example. The action of PLMA on growing surfaces of FAME crystals hence depressed the growth further and kept the fuel fluid for larger ranges of temperature even after the first crystals were observed.

At this point the fundamental mechanism for synergistic functioning of the VOCMs and PPDs cannot be accurately ascertained. Without being bound by theory, whether it was a delay in nucleation, a disruption of the growth or inhibition of aggregation, it has been revealed that the effect of the cold flow additives were active when these fundamental actions resulted in a significant reduction in microstructure size. More clearly, any additive that can result in affecting FAME crystallization at the microscale is able to affect the pour point of biodiesel. The cloud point would be affected as well, but at lower magnitudes. Without being bound by theory, a structural feature common to all the VOCM additives that resulted in a significant reduction of the crystal size of biodiesel was the presence of a chain length mismatch between the additive molecule and the saturated FAMEs.

To review, the problems inherent to the low temperature flow of biodiesel are shown to be mitigated by a choice of cold flow improver (CFI) additives sourced from natural oils (vegetable oils) and their derivatives. A setup especially designed based on ASTM methods provided very accurate measurements of the cloud point (CP) and the pour point (PP) of biodiesel that can be directly compared to industrial field operability standardized measurements. The series of compounds investigated in the study were obtained using green and economical chemistries such as metathesis and comprise pure compounds such as TAGs and oligomers of TAGs as well more complex mixtures such as self-metathesized soybean oil (MSBO) and cross-metathesized palm oil (PMTAG).

The single additives provided depressions in the PP of biodiesel as large as 10° C. However, although having prevented the early crystallization and dramatically reduced the size of the crystals of biodiesel, these compounds did not prevent the aggregation of the crystals and therefore did not sufficiently address lowering of the PP. These vegetable oil derivatives are basically crystallization modifiers (VOCMs) most effective at the nucleation and growth stages of the crystallization process where they induce dramatic changes to the type and rate of nucleation, and significantly impact the rate and direction of growth, reducing crystal size dramatically.

Without being bound by theory, the VOCM delays the crystallization onset substantially enough and then forms crystals with surface characteristics most favorable for adsorbing the PPD. The compositions not only affected the nucleation and crystal growth but also provided barriers to agglomeration and transformed the solid-liquid interface characteristics that prevented the gelling of the biodiesel for an extended temperature range. Each particular contribution of the VOCM or PPD is not restricted to one of these actions but rather worked in unison. The ultimate result was the delaying of the formation of a gelling network along all the length scales involved during the cooling process.

The cocktail additives investigated here can be readily tested at an industrial scale and straightforwardly used with biodiesel and its blends to lower the CP and PP in a manner never achieved before. The compositions can be used all year long even in the coldest climates.

The foregoing detailed description and accompanying figures provided a fundamental understanding necessary to optimize the use of structured additives for the improvement of the cold flow behavior of biodiesel through suppression of crystallization and reduction of crystal size. Moreover, the foregoing detailed description and accompanying figures have been provided by way of explanation and illustration, and are not intended to limit the scope of the disclosure. Many variations in the present embodiments illustrated herein will be apparent to one of ordinary skill in the art, and remain within the scope of any current or future claims and their equivalents.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

IUPAC names and chemical structure of vegetable oil derived crystallization modifiers (VOCMs)

| Selected VOCMs | IUPAC names and general Structure of VOCMs |
|---|---|
| 1,3 dioleoyl 2-steroyl sn-glycerol (OSO) | 9-Octadecenoic acid (Z)-, 2-[(1-oxooctadecyl) oxy]-1, 3-propanediyl ester |
| (1,3 dioleoyl 2-palmitoyl sn-glycerol OPO) | 9-Octadecenoic acid (Z)-, 2-[(1-oxohexadecyl)oxy]-1,3-propanediyl ester |
| Dimer of OPO-Dimer | E)-1-(1-(oleoyloxy)-3-(stearyloxy)propan-2-yl) 18-(1-(oleyloxy) propan-2-yl) octadec-9-enedioate, a dimer of OPO |

TABLE 1-continued

IUPAC names and chemical structure of vegetable oil derived crystallization modifiers (VOCMs)

| Selected VOCMs | IUPAC names and general Structure of VOCMs |
|---|---|
| self-metathesized soybean oil (MSBO) | 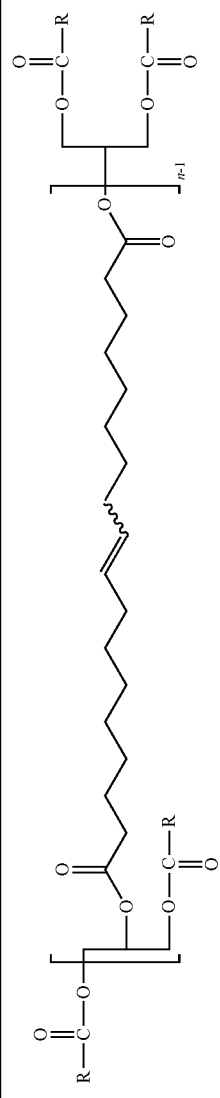 |
| | General structure of triacylglycerols (TAGs) monomers and TAG-oligomers[a,b] of metathesized soybean oil (MSBO)<br>[a] $n$ represents oligomer level ($n$ = 1: TAG monomer; $n$ = 2: dimer; $n$ = 3: trimer; $n$ = 4: quatrimer; etc.).<br>[b] RCOOH = stearic acid (S), palmitic acid (P), oleic acid (O), linoleic acid (L), linolenic acid (Ln). Double bonds in R include cis- and trans- configurations such as in elaidic acid (E) R in MTO is from oleic acid, and R in MSBO is mainly from oleic acid, linoleic acid, linolenic acid, stearic acid or palmitic acid |
| cross-metathesized palm oil (PMTAG) | 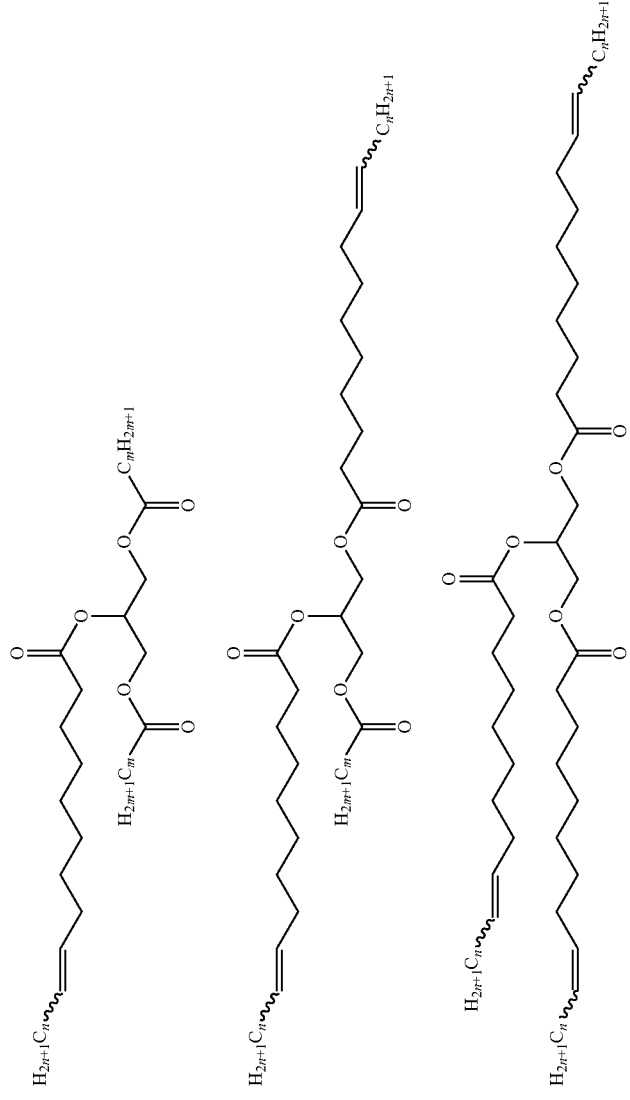 |
| | General Structure of cross metathesized palm oil. $n$ is the number of carbons. |

TABLE 2

Composition of Soy 1500 as determined by GC.

| FAME | % |
| --- | --- |
| Methyl Linoleate (MeLn) | 53.8 |
| Methyl Oleate (MeO) | 29.9 |
| Methyl Palmitate (MeP) | 10.6 |
| Methyl Stearate (MeS) | 3.8 |
| Unknown | 1.9 |

FAME: fatty acid methyl ester

TABLE 3

Depression in cloud point (CP) of Soy obtained with selected additives.

| Additive | ΔCP (±0.5° C.) |
| --- | --- |
| Soy 1500 + 1.5% w/w OPO | 1.0 |
| Soy 1500 + 2.0% w/w OSO | 4.0 |
| Soy 1500 + 0.5% w/w Dimer | 3.0 |
| Soy 1500 + 1.0% w/w MSBO | 3.0 |
| Soy 1500 + 1.5% w/w PMTAG | 3.0 |
| Soy 1500 + 1.0% w/w PLMA | 3.0 |
| Soy 1500 + 0.2% w/w PLMA + 1.5% w/w OPO | 1.0 |
| Soy 1500 + 0.2% w/w PLMA + 0.5% w/w Dimer | 3.0 |
| Soy 1500 + 0.2% w/w PLMA + 2% w/w PMTAG | 3.0 |
| Soy 1500 + 0.2% w/w PLMA + 2% w/w MSBO | 4.0 |
| Soy 1500 + 0.2% w/w PLMA + 2% w/w OSO | 4.0 |

ΔCP is the difference between CP of the sample and CP = 0° C. of neat biodiesel

TABLE 1

Pour point (PP) of the most effective samples.

| Additive | CP (±0.5° C.) | ΔPP (±0.5° C.) |
| --- | --- | --- |
| Soy 1500 + 1.5% w/w OPO | −2.0 | 1.0 |
| Soy 1500 + 2.0% w/w OSO | −5.0 | 4.0 |
| Soy 1500 + 0.5% w/w Dimer | −4.0 | 3.0 |
| Soy 1500 + 2.0% w/w MSBO | −6.0 | 5.0 |
| Soy 1500 + 2.0% w/w PMTAG | −8.0 | 7.0 |
| Soy 1500 + 1.0% w/w PLMA | −6.0 | 5.0 |
| Soy 1500 + 0.2% w/w PLMA + 1.5% w/w OPO | −4.0 | 3.0 |

TABLE 1-continued

Pour point (PP) of the most effective samples.

| Additive | CP (±0.5° C.) | ΔPP (±0.5° C.) |
| --- | --- | --- |
| Soy 1500 + 0.2% w/w PLMA + 0.5% w/w Dimer | −5.0 | 4.0 |
| Soy 1500 + 0.2% w/w PLMA + 2% w/w PMTAG | −13.0 | 12.0 |
| Soy 1500 + 0.5% w/w PLMA + 2% w/w PMTAG | −24.0 | 23.0 |
| Soy 1500 + 0.5% w/w PLMA + 4% w/w PMTAG | −30.5 | 29.5 |
| Soy 1500 + 0.2% w/w PLMA + 2% w/w MSBO | −6.0 | 5.0 |
| Soy 1500 + 0.2% w/w PLMA + 2% w/w OSO | −10.5 | 9.5 |
| Soy 1500 + 0.2% w/w PLMA + 3% w/w OSO | −15.0 | 15.0 |

ΔPP is the difference between PP of the sample and PP of pure biodiesel (−1° C.)

The invention claimed is:

1. A biodiesel composition comprising:
a) a biodiesel fuel;
b) about 0.2% (w/w) of polylauryl-methacrylate; and
c) about 3.0% (w/w) to about 5.0 (w/w) of 1,3 dioleyl 2-stearoyl sn-glycerol (OSO); wherein the composition decreases the pour point temperature of the biodiesel fuel by at least about 15° C.

2. The biodiesel composition of claim 1, wherein the biodiesel fuel comprises at least one saturated, monounsaturated, or polyunsaturated fatty acid methyl ester or ethyl ester.

3. The biodiesel composition of claim 2, wherein the at least one saturated, monounsaturated, or polyunsaturated fatty acid methyl ester is selected from the group consisting of methyl palmitate, methyl laurate, methyl myristate, methyl caprate, methyl linoleate, methyl linolenate, methyl oleate, methyl stearate, methyl arachidate, and methyl behenate, individually or combinations thereof.

4. A method for decreasing the pour point temperature and/or cloud point temperature of a biodiesel fuel, the method comprising contacting or mixing a biodiesel fuel with a composition comprising:
a) about 0.2% (w/w) of polylauryl-methacrylate; and
b) about 3.0% (w/w) to about 5.0 (w/w) of 1,3 dioleyl 2-stearoyl sn-glycerol (OSO);
wherein the composition decreases the pour point temperature of the biodiesel fuel by at least about 15° C.

* * * * *